(12) United States Patent
Kang et al.

(10) Patent No.: US 8,704,760 B2
(45) Date of Patent: Apr. 22, 2014

(54) IMAGE DISPLAY APPARATUS CAPABLE OF RECOMMENDING CONTENTS ACCORDING TO EMOTIONAL INFORMATION

(75) Inventors: Mingoo Kang, Seoul (KR); Haengjoon Kang, Seoul (KR); Sunjung Hwang, Seoul (KR); Youngjae Seo, Seoul (KR); Jongsoon Park, Seoul (KR); Jinyung Park, Seoul (KR); Jongchul Kim, Seoul (KR); Junho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 379 days.

(21) Appl. No.: 12/959,557

(22) Filed: Dec. 3, 2010

(65) Prior Publication Data

US 2011/0134026 A1 Jun. 9, 2011

Related U.S. Application Data

(60) Provisional application No. 61/266,941, filed on Dec. 4, 2009.

(30) Foreign Application Priority Data

Mar. 3, 2010 (KR) .................. 10-2010-0019141

(51) Int. Cl.
*G09G 5/00* (2006.01)

(52) U.S. Cl.
USPC ............................................ 345/156; 725/46

(58) Field of Classification Search
USPC .............................................. 725/46; 345/156
See application file for complete search history.

(56) References Cited

U.S. PATENT DOCUMENTS

| | | | | |
|---|---|---|---|---|
| 6,927,694 | B1 * | 8/2005 | Smith et al. .................... | 340/576 |
| 8,204,747 | B2 * | 6/2012 | Kato et al. ..................... | 704/254 |
| 8,581,954 | B2 * | 11/2013 | Lee et al. ..................... | 348/14.02 |
| 2002/0085023 | A1 * | 7/2002 | Zustak et al. ................. | 345/733 |
| 2003/0063222 | A1 * | 4/2003 | Creed et al. ................... | 348/687 |
| 2004/0001616 | A1 * | 1/2004 | Gutta et al. .................... | 382/118 |
| 2006/0127041 | A1 * | 6/2006 | Shimizu ......................... | 386/95 |
| 2008/0235284 | A1 * | 9/2008 | Aarts et al. ................ | 707/104.1 |
| 2008/0294012 | A1 * | 11/2008 | Kurtz et al. .................... | 600/300 |
| 2009/0133064 | A1 * | 5/2009 | Maruyama et al. ............. | 725/40 |
| 2009/0174680 | A1 * | 7/2009 | Anzures et al. ............... | 345/173 |
| 2009/0222867 | A1 * | 9/2009 | Munetsugu .................... | 725/100 |
| 2009/0271820 | A1 * | 10/2009 | Choi et al. ....................... | 725/37 |
| 2009/0307222 | A1 * | 12/2009 | Matraszek et al. ................ | 707/7 |

\* cited by examiner

*Primary Examiner* — Grant Sitta
(74) *Attorney, Agent, or Firm* — Birch, Stewart, Kolasch & Birch, LLP

(57) ABSTRACT

In accordance with an aspect of the present invention, a method for controlling an image display apparatus includes obtaining, by the image display apparatus, emotion information associated with a user of the image display apparatus, determining a contents to be recommended for the user among a plurality of different contents, based on the obtained emotion information associated with the user, and selectively or automatically reproducing one of the recommended contents at the image display apparatus.

18 Claims, 23 Drawing Sheets

(a)

(b)

(a)  (b)  (c)

IMAGE DISPLAY APPARATUS CAPABLE OF RECOMMENDING CONTENTS ACCORDING TO EMOTIONAL INFORMATION

CROSS-REFERENCE TO RELATED APPLICATION

This application claims the benefit of U.S. Provisional Application No. 61/266,941 filed on Dec. 4, 2009 in the USPTO and the benefit of Korean Patent Application No. 10-2010-0019141, filed on Mar. 3, 2010 in the Korean Intellectual Property Office. The entire contents of each of these applications are incorporated herein by reference.

BACKGROUND OF THE INVENTION

1. Field of the Invention

The present invention relates to an image display apparatus and a method for operating the same, and more particularly, to an image display apparatus and a method for operating the same, which can share content according to emotional information of a user.

2. Description of the Related Art

An image display apparatus has a function of displaying images or outputting sounds. The image display apparatus is generally capable of a variety of functions such as capturing a photo or a video, playback of a music file or a video file, gaming, broadcast reception, wireless Internet browsing, voice call and video call. Considerable efforts have focused on enhancing the usability of image display apparatuses.

SUMMARY OF THE INVENTION

Therefore, the present invention has been made in view of the above problems, and it is an object of the present invention to provide an image display apparatus and a method for operating the same, which can share content according to emotional information of a user.

It is another object of the present invention to provide an image display apparatus and a method for operating the same, which can increase user convenience.

In accordance with an aspect of the present invention, the above and other objects can be accomplished by the provision of a method for controlling an image display apparatus, the method comprising obtaining emotion information associated with a user of the image display apparatus, determining a content to be recommended for the user among a plurality of different contents, based on the emotion information associated with the user, and selectively or automatically reproducing the recommended content at the image display apparatus.

In accordance with another aspect of the present invention, there is provided a method for controlling an image display apparatus comprising displaying, to a current user of the image display apparatus on a screen of the image display apparatus, one or more emotion information each for another user at another apparatus, receiving, at the image display apparatus for another user at another apparatus, the current user's recommendation for a specific content among a plurality of different contents based on the displayed emotion information, and transmitting, to said another apparatus, the current user's recommendation.

In accordance with an aspect of the present invention, a method for controlling an image display apparatus includes obtaining, by the image display apparatus, emotion information associated with a user of the image display apparatus, determining a contents to be recommended for the user among a plurality of different contents, based on the obtained emotion information associated with the user, and selectively or automatically reproducing one of the recommended contents at the image display apparatus.

In accordance with another aspect of the present invention, a method for controlling an image display apparatus includes displaying, on a screen of the image display apparatus of a current user, one or more emotion information each for another user at another apparatus, receiving, at the image display apparatus for another user at another apparatus, a first recommendation of the current user for a first content among a plurality of different contents based on the displayed emotion information; and transmitting, to said another apparatus, the first recommendation.

In accordance with another aspect of the present invention, a method for controlling an image display apparatus includes obtaining, by the image display apparatus, emotion information associated with a user of the image display apparatus, determining at least one broadcast program to be recommended for the user among a plurality of different broadcast programs, based on the obtained emotion information associated with the user, displaying, on a screen of the image display apparatus, the plurality of different broadcast programs contrasting the at least one broadcast program to be recommended for the user, and selectively or automatically reproducing the at least one broadcast program to be recommended at the image display apparatus.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described below with reference to the attached drawings.

The terms "module" and "unit" are simply used herein to aid the understanding of the components and should not be considered as having specific meanings or roles. Accordingly, the terms "module" and "unit" may be used interchangeably.

Figure 1:
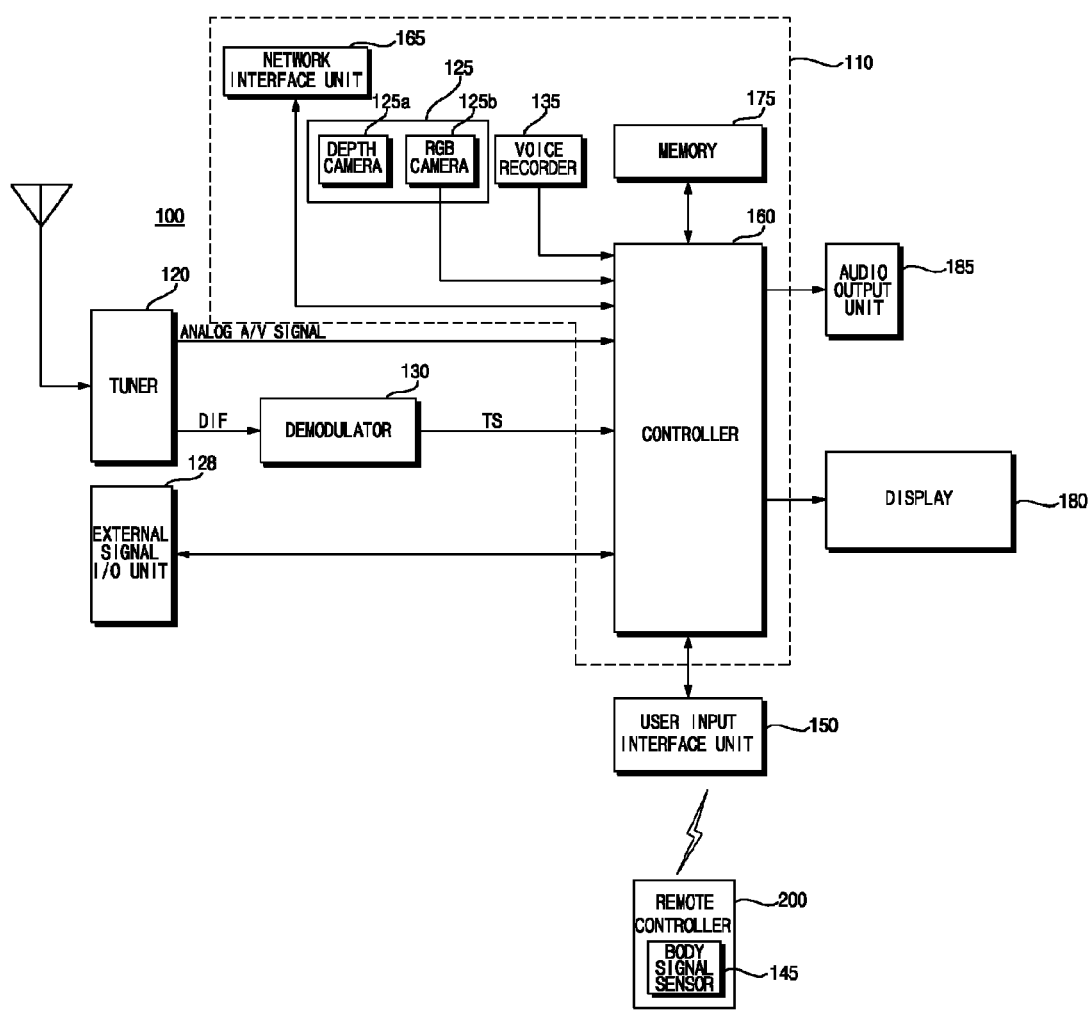
FIG. 1 is a block diagram of an image display apparatus for sharing content according to emotional information according to an embodiment of the present invention.
Figure 2:
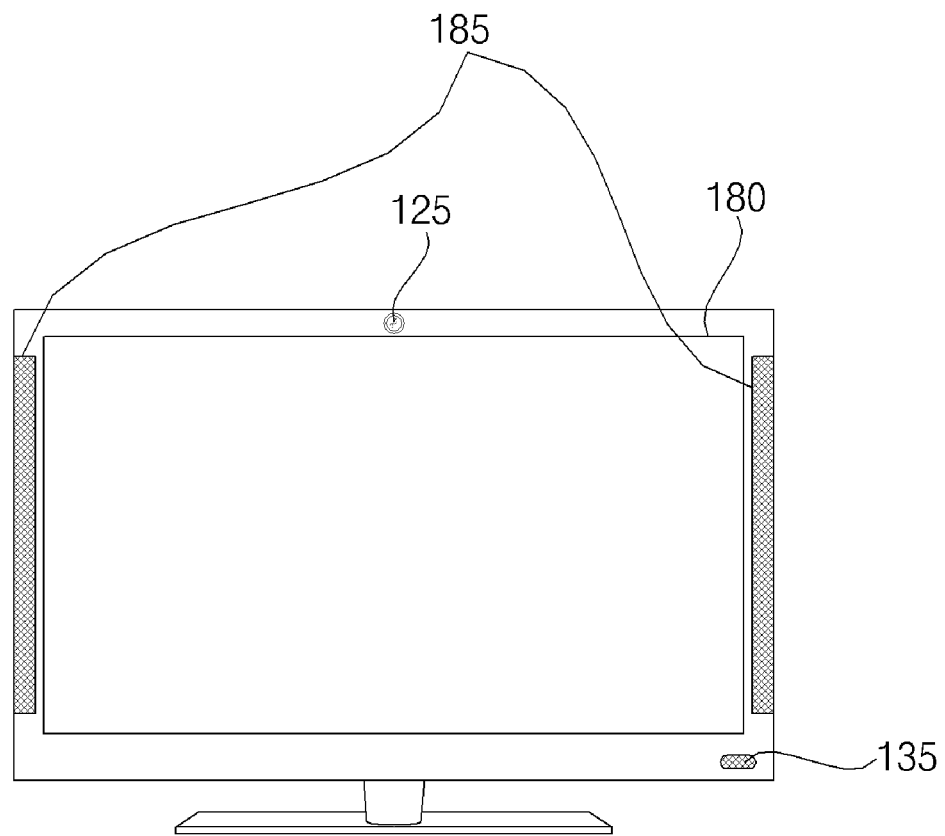
FIG. 2 is a simplified view of the exterior of the image display apparatus illustrated in FIG. 1.
Figure 2:
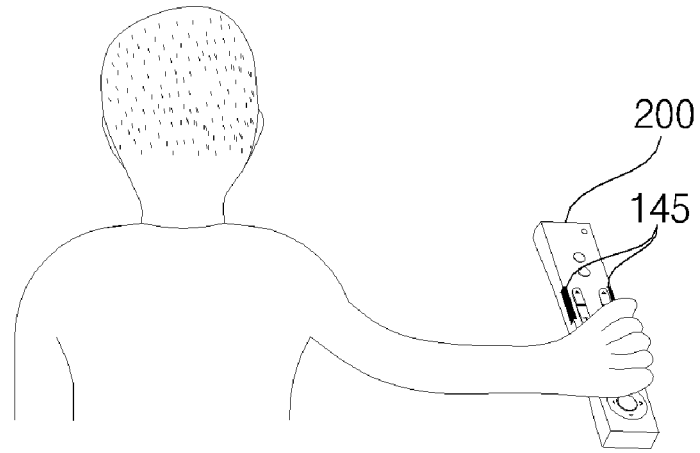
Figure 3:
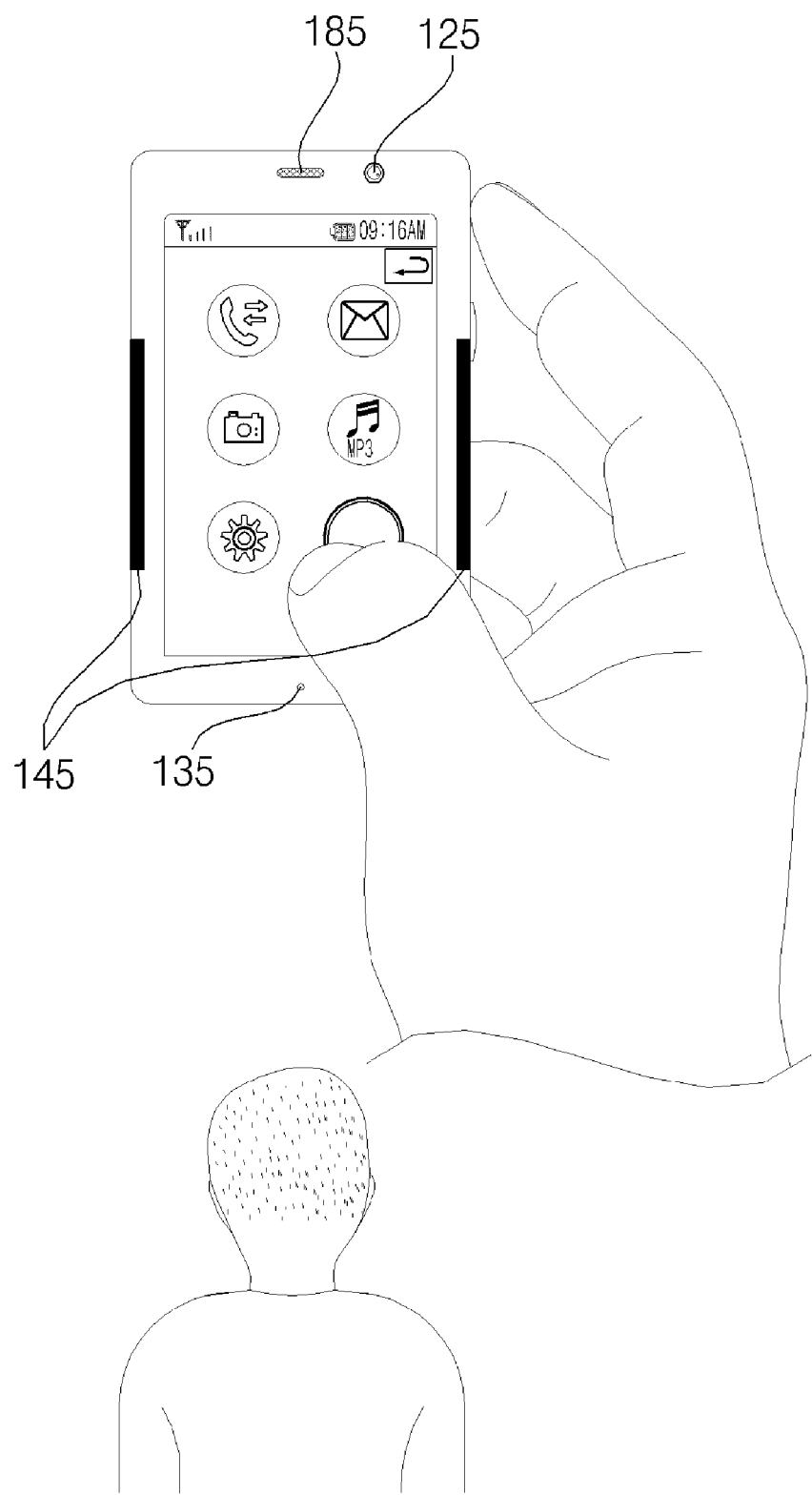
FIG. 3 is a simplified view of the exterior of a portable terminal.
Figure 4:
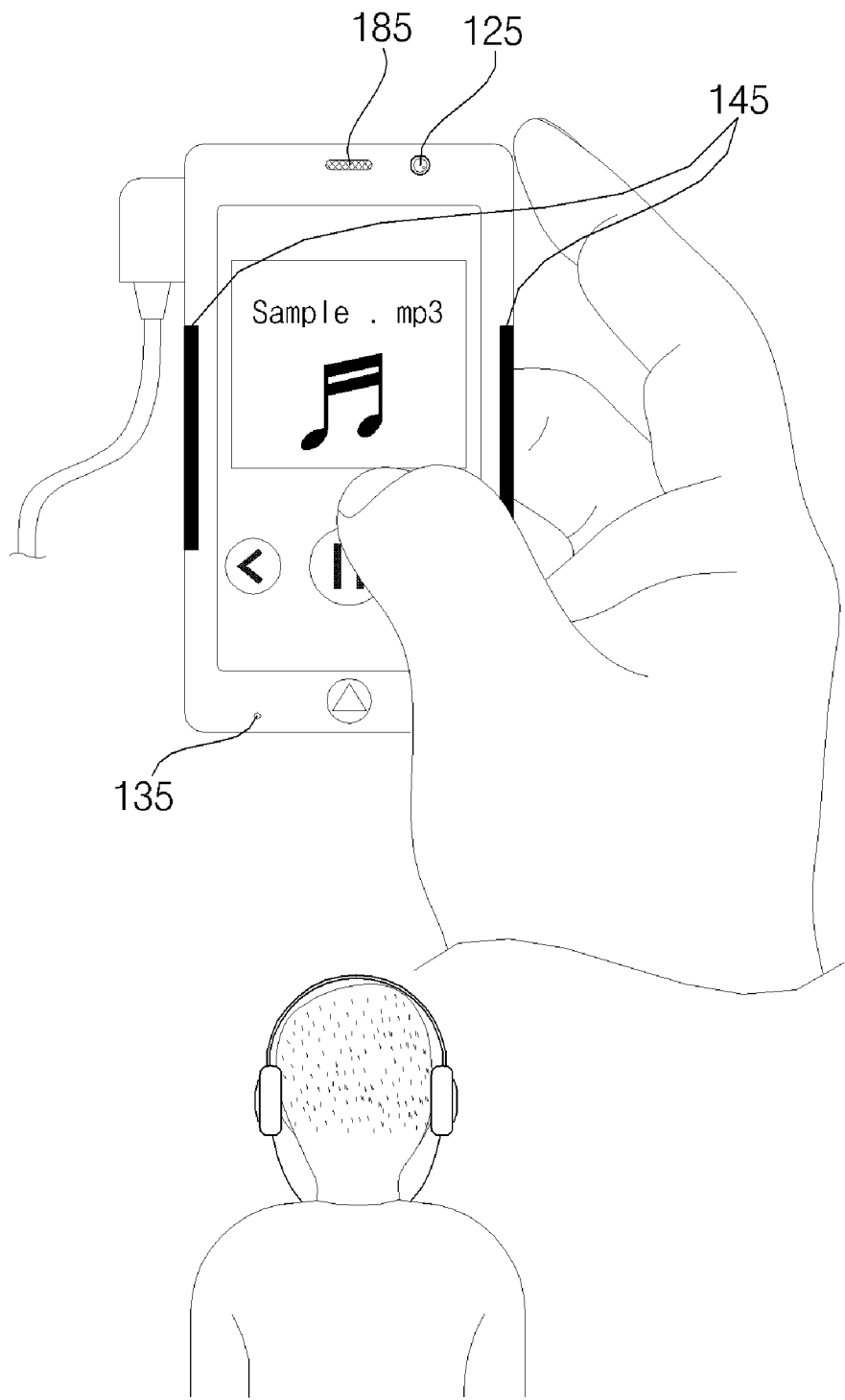
FIG. 4 is a simplified view of the exterior of a portable audio player.
Figure 5A:
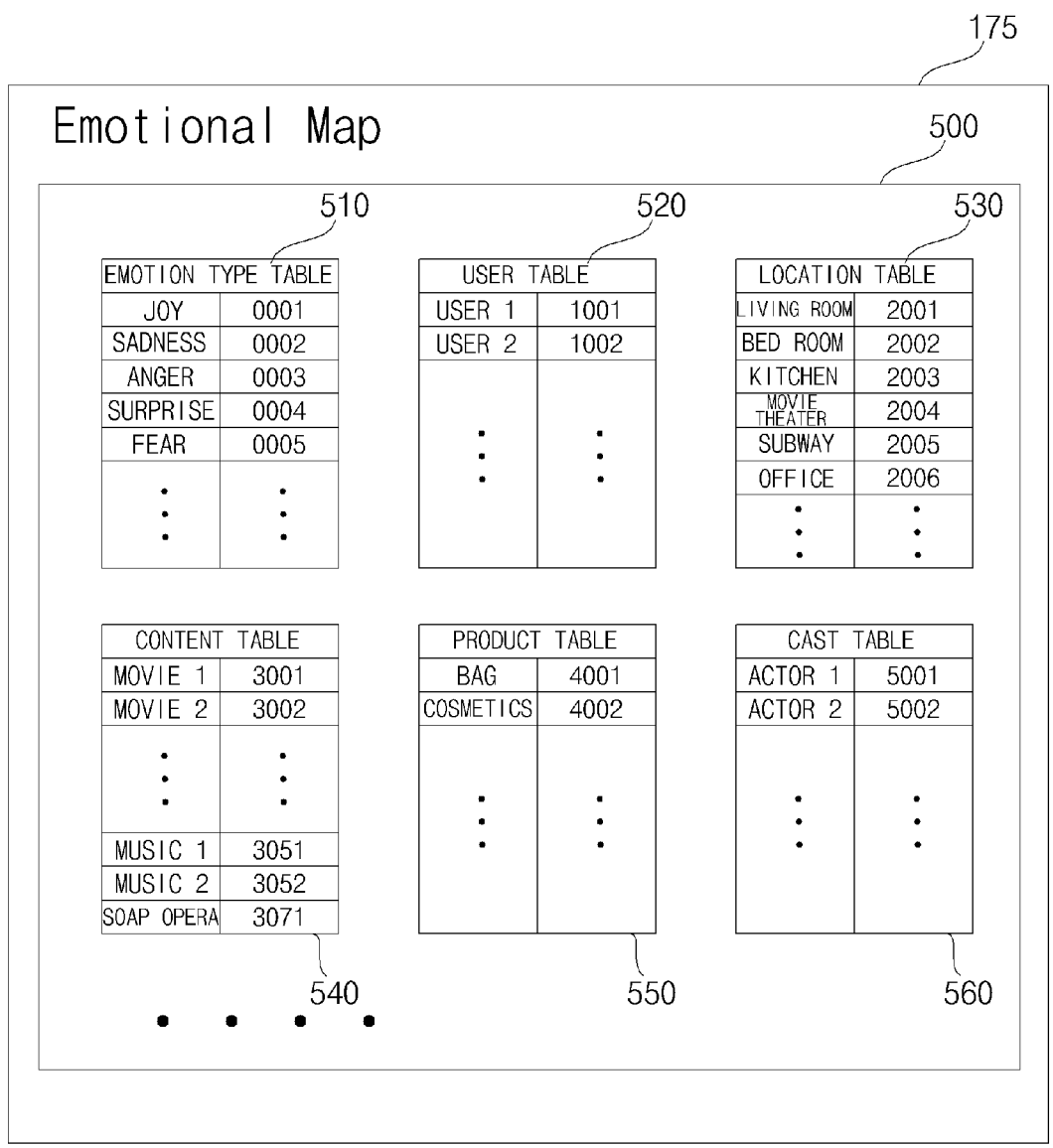
FIG. 5A illustrates an emotional map stored in a memory illustrated in FIG. 1.

FIG. 1 is a block diagram of an image display apparatus for reproducing content according to emotional information according to an embodiment of the present invention, FIG. 2 is a simplified view of the exterior of the image display apparatus illustrated in FIG. 1, FIG. 3 is a simplified view of the exterior of a portable terminal, FIG. 4 is a simplified view of the exterior of a portable audio player, and FIG. 5A illustrates an emotional map stored in a memory illustrated in FIG. 1.

Referring to FIG. 1, an image display apparatus 100 may include a tuner 120, an external signal Input/Output (I/O) unit 128, a demodulator 130, an image capture unit 125, a voice recorder 135, a user input interface unit 150, a controller 160, a memory 175, a display 180, and an audio output unit 185. The image display apparatus 100 may further include a network interface unit 165.

The tuner 120 selects a Radio Frequency (RF) broadcast signal of a channel selected by the user or RF broadcast signals of all of pre-stored channels from among RF broadcast signals received through an antenna. The tuner 120 also converts the selected RF broadcast signal into a digital Intermediate Frequency (IF) signal DIF or an analog baseband audio/video (A/V) signal.

First, the image capture unit 125 captures at least a part of a user's body. For instance, the image capture unit 125 may capture an image of the user's face, particularly specific parts of the face such as the eyes and eyebrows. To capture the user, the image capture unit 125 may be positioned at an upper end of the display 180. For example, the image capture unit 125 may be a camera, a camcorder, etc. The captured image is transmitted to the controller 160 generating emotional information. Further, the image display apparatus 100 may include a plurality of image capture units 125. In addition, the image capture unit 125 may be installed at the outside of the image display apparatus 100, or be embedded in the image display apparatus 100.

Also, the image capture unit 125 may include two types of image capture units, for example, a depth camera 125a and a Red, Green, Blue (RGB) camera 125b. The depth camera 125a may be a Time Of Flight (TOF) camera or a Structured Light camera.

First, the TOF camera includes an infrared light source and an image sensor. The TOF camera emits an infrared ray from the infrared light source and measures the distance between an object by calculating a phase difference between the emitted infrared ray and an infrared ray reflected from the object. Further, the Structured Light camera projects a series of infrared patterns (multiple infrared points) onto an object from an infrared light source, captures patterns reflected from the object through an image sensor, and obtains the distance between the object and the Structured Light camera based on the warping of the reflected patterns.

On the other hand, the RGB camera 125b may include three image sensors (Complementary Metal Oxide Semiconductor (CMOS) image sensors), and obtain R, G and B color information. In comparison to the depth camera 125a, the RGB camera 125b obtains a relatively high-resolution image.

Despite the advantage of rapid recognition and processing of a fast motion or a motion made along a large trajectory, the depth camera 125a is disfavored when detecting a motion having a small trajectory and remotely detecting a motion because of its slow recognition rate. By contrast, the RGB camera 125b is capable of capturing a slow motion or a small-trajectory motion, or accurately capturing facial expressions. Accordingly, although the image capture unit 125 may capture a user's face using only one of the depth camera 125a and the RGB camera 125b, using two cameras provides a more accurate facial recognition. For example, the image capture unit 125 may extracts the coordinates of a captured user's face using the depth camera 125a. Then, based on the extracted coordinates, the RGB camera 125b may capture the more rapid and accurate facial expressions of the user. This face capturing scheme enables more efficient face recognition, for example, when the user is at a considerable distance from the image capture unit or when the user's facial expression changes rapidly. Irrespective of the distance to the user or the rapid change in the user's facial expression, the RGB camera 125b may capture accurate facial expressions based on facial coordinate information extracted from the depth camera 125a.

The above-described depth camera 125a and the RGB camera 125b are purely exemplary. Therefore, the present invention can be implemented using other types of capture devices for obtaining image information using the aforementioned methods.

Then, the captured image is provided to the controller 160. The image capture unit 125 may be, for example, a camera, a camcorder, or the like. The image capture unit 125 may be attached to an image display apparatus such as a TV shown in FIG. 2, a portable terminal shown in FIG. 3, a portable audio player such as an MP3 player shown in FIG. 4, or a remote controller 200 for controlling an electronic device such as an image display apparatus as shown in FIG. 2. Here, the captured image may be a still image or video.

Next, the external signal I/O unit 128 receives signals from an external device. For example, the external signal I/O unit 128 may be connected to an external device such as a Digital Versatile Disk (DVD) player, a Bluray player, a game player, a camcorder, a computer, etc. Here, the external signal I/O unit 128 may provide an external video signal, audio signal and data signal to the controller 160 of the image display apparatus 100. In addition, the external signal I/O unit 128 may output processed video, audio and data signals received from the controller 160 to the external device.

Referring to FIG. 1, the demodulator 130 receives the digital IF signal DIF from the tuner 1820 and demodulates the digital IF signal DIF. In addition, the voice recorder 135 records the user's voice. For this purpose, the voice recorder 135 may be positioned at a lower end of the display 180. The recorded voice may be input to the controller 160 for generating emotional information.

Further, the body signal sensor 145 senses a user's body signal. To sense the user's body signal, the body signal sensor 145 may be carried with the user. For example, the body signal sensor 145 may be provided, for example, in the remote controller 200 of FIG. 2, the portable terminal shown in FIG. 3, or the portable audio recorder shown in FIG. 4, such as a MP3 player. Also, the body signal sensor 145 may be installed in an accessory such as a wrist watch, a pendant of a necklace, a pendant of a bracelet, a headset, and an earphone, in order to be in contact with the user's body. With the body signal sensor 145 in the remote controller or in the accessory worn on the user's body, a body signal may be sensed from the user, while the user may remotely control a multimedia player using the remote controller. Here, the sensed body signal is input to the controller 160 wirelessly or by a cable through the network interface unit 165. As illustrated in FIG. 4, brain waves of the user may be monitored through a headset of the portable audio player.

For example, the body signal sensor 145 may sense a galvanic skin response (GSR), a skin temperature (SKT), an electrocardiogram (ECG), an electromyograph (EMG), brain waves, a respiration, etc. The user's information about arousal, concentration, etc. may be monitored based on these vital signs. The GSR measures changes in the conductivity of the surface of a person's skin according to psychological state. Specifically, the GSR is a reflection of a sweat gland activity. The SKT is a change in a body surface temperature. The ECG is the pattern of the P, Q, R, S and T waves extracted as signals representing the minute electrical signals produced by the beating heart, amplified by a cardiograph. The EMG is an electrical recording of neuromuscular activities concerning muscular contraction and relaxation. The brain waves are divided into alpha waves, beta waves, slow waves, fast waves, etc. To sense brain waves, respiration speed, respiration depth, etc., the body signal sensor 145 may be a head mount (HT) type sensor.

The image captured by the image capture unit 125, the voice recorded by the voice recorder 135, and the body signal sensed by the body signal sensor 145 in FIGS. 2, 3 and 4 may be transmitted to an external network, for example, an external server or to other electronic devices within a short range by short-range communication, through the network interface unit 165, instead of being provided to the controller 160. A main electronic device serving as the server from among the electronic devices may process these signals.

Further, the body signal sensor 145 may be provided in the display 180. For example, when the display 180 is configured to be a touch screen or a touch pad, the body signal sensor 145 may be attached to the display 180 to sense a body signal when the user touches the display 180.

The user input interface unit 150 transmits an input signal received from the user to the controller 160 or a signal received from the controller 160 to the user. Especially, the user input interface unit 150 provides a body signal sensed by the body signal sensor 145 to the controller 160.

Next, the controller 160 provides an overall control to the image display apparatus 100. In addition, the controller 160 may demultiplex an input stream into audio, video and/or data signals, for outputting an image and sound. Further, the controller 160 may include a demultiplexer, a video processor, an audio processor, an On Screen Display (OSD) generator, and an emotional information processor.

In addition, the controller 160 may determine the emotional state of the user based on at least one of the image captured by the image capture unit 125, the voice recorded by the voice recorder 135, or the body signal sensed by the body signal sensor 145. Here, the accuracy of the user's recognized emotional state may be increased using at least two of the received image, voice, and body signal. Further, the controller 160 may extract user's facial information from the captured image using a facial information extraction algorithm. Many facial information extraction algorithms are available, which will not be described herein because the focus is not upon them.

First, upon receipt of the captured image from the image capture unit 125, the controller 160 may determine the emotional state of the user by comparing the captured image with reference images. For example, the reference images may be a number of images of facial expressions representing various emotional states. In addition, the reference images may be retained in a network, not in a local memory.

Further, the controller 160 may extract a facial image from the captured image and compare user's facial image with the reference images. Alternatively or additionally, the controller 160 may extract a plurality of feature points from the extracted facial image and compare the distances between the feature points of the extracted image with the distances between features points in the reference images. Here, the plurality of feature points may be located on at least two facial parts selected from the eyes, the eyebrows, the nose, the mouth, the ears, and the philtrum.

A Facial Action Coding System (FACS) algorithm and a fuzzy rule based algorithm may be utilized to determine the emotional state of the user. The FACS algorithm divides the movement of facial muscles into 44 Action Units (AUs) each corresponding to a visual change in a facial expression and identifies an emotional state using combinations of the AUs. On the other hand, the fuzzy rule based algorithm determines an emotional state using facial feature points and parameters by fuzzy inference. In this manner, the controller 160 may recognize various emotional states using a reference image most closely approximating the captured image. Further, the emotional states may be categorized into joy, sadness, anger, surprise, fear, disgust, composure, anxiety, friendly, hostile, excitement, etc.

Meanwhile, the controller 160 may process the captured image and determine the emotional state of the user using the processed image only when a variation is detected from the image captured by the image capture unit 125. For instance, if the variation of at least one facial part from among the eyes, eyebrows, nose, mouth, ears, or philtrum of the user's face in size, position, shape, color or motion is equal to or larger than a predetermined value, the controller 160 may determine that the emotional state of the user is changed based on the changed size, position, shape and/or color of the at least one facial part. Here, a valid captured image may be a frontal face of the user. In this case, the controller 160 may generate emotional information, referring to images captured by a plurality of image capture units, a recorded voice or a sensed body signal.

Secondly, upon receipt of the recorded voice from the voice recorder 135, the controller 160 may determine the emotional state by comparing the recorded voice with reference voices. Alternatively or additionally, the controller 160 may determine the emotional state by processing the recorded voice only when a variation of the recorded voice exceeds a predetermined value. Especially, the controller 160 may determine the emotional state based on the pitch, intensity, pace, etc. of the voice. For example, the emotional state can be identified based on a Log Frequency Power Coefficient (LFPC) feature vector of intensities of voice that has passed through the filters of a filter bank.

Further, the controller 160 may determine the emotional state of the user, comprehensively taking into an account the image captured by the image capture unit 125, the voice recorded by the voice recorder 135, and the body signal sensed by the body signal sensor 145. For example, the user's emotional information may be generated separately using the captured image and the recorded voice. Next, common emotional information may be extracted by comparing the two pieces of the user's emotional information, thereby increasing the accuracy of the emotional information. Alternatively, the emotional information may be generated separately using the captured image and the sensed body signal and then combined, or be generated separately using the recorded voice and the sensed body signal and then combined.

Here, the captured image, the recorded voice and the body signal may be assigned different weights thereby generating the user's emotional information in proportion to the significance of the signals. For instance, recorded voices of a plurality of users may be inaccurate. Thus, the recorded voices may be weighted less heavily than captured images of the plurality of users. On the other hand, if the user is moving, the weight of the user's recorded voice may be higher than the other factors including a captured image and/or a sensed body signal. Therefore, the user's emotional state may be identified more accurately, taking into an account the situation in which the user is.

Further, the emotional states of the plurality of users may be determined separately and then combined to yield a representative emotional state. Specifically, the emotional state of each user may be determined mainly based on a captured image or sensed body signal of each rather than recorded voice of the each user. Here, a determined mean value of the emotional states of each user may be the representative emotional state of the plurality of the users. Further, if a specific content is being reproduced for the plurality of users, the emotional states of the users may be recognized separately and a representative emotional state may be determined for the reproduced content based on the emotional states in the above manner. In addition, when the emotional information of each user is generated, that is, the individual's emotional state is determined, image information or physical information of the individual may be more heavily weighted than voice information of the individual.

Emotional states of the user may be monitored over time and the representative emotional state of the user (i.e. the representative emotional curve of the user) may be calculated by averaging the emotional states. Further, a different weight may be assigned to each user according to the category of the content being reproduced and representative emotional information may be generated for the plurality of users according to the weight assigned to each user. For instance, when displaying an image for kids, a higher weight may be applied to emotional information of a child, who is what the image than emotional information of an adult watching the image together with the child, to thereby create representative emotional information for the child and the adult.

Meanwhile, the controller 160 may generate attention information of the user based on at least one of the user's motions, a viewing duration of reproduced content, a volume down/up, or the length of time the user fixes his or her gaze on the content. Here, the presence or absence of the user's motion or the magnitude of the motion, and the length of time the user fixes his or her gaze on the content may be obtained by the image capture unit 125. The attention information may be used to determine the intensity of the user's emotion or the reliability of the user's emotional information. That is, a specific scene or a content which the user has concentrated on may increase the reliability of the intensity of the representative emotion about the scene or the content. Here, when a plurality of users is present, representative emotional information may be created based on attention information and emotional information of the individual users.

Further, the controller 160 may generate emotional intensity information based on at least one of image information, voice information or physical information of a user. For example, if the user has made large gestures or the volume of the user's voice that equals or exceeds a predetermined value, the user's emotional intensity information representing the intensity of emotion that the user feels may be generated in addition to emotional information representing the type of the emotion.

The controller 160 may control a generation of an icon or avatar representing the identified emotional state of the user and then control displaying of the icon or avatar together with a specific scene, frame (frames), and content on the display 180.

Also, the controller 160 may recommend or share a specific content corresponding to the generated emotional information of the user or share the emotional information, over a network For example, the controller 160 may transmit or receive emotional information or information about the recommended content to or from another user over a connected network through the network interface unit 165.

The controller 160 may control display of at least one thumbnail image representing the content corresponding to the emotional information of the user on the display 180. The content corresponding to the emotional information of the user may be stored in the image display apparatus 100 or received from a local device or the network.

In addition to sharing the emotional information or recommending the content based on the emotional information of the user, the controller 160 may share attention information that can be obtained from a captured image, recorded voice, and/or a physical signal of the user or recommend a content according to the attention information. When a plurality of users is present, the controller 160 may share representative emotional information of the users or recommend a specific content according to the representative emotional information. Specifically, a different weight may be assigned to each user according to the category of the content being reproduced and representative emotional information may be generated for the plurality of users according to the weights. For instance, when displaying an image for kids, a higher weight is applied to emotional information of a child than emotional information of an adult watching the image together with the child, to thereby create representative emotional information for the child and the adult.

Further, the controller 160 may control display of an object representing the emotional information of the user on the display 180. The controller 160 may also control the tuner 120 to tune to a selected channel or a pre-stored channel and thus to receive an RF signal on the channel. In addition, the controller 160 may process the video, audio, and data signals obtained by multiplexing the input stream. Further, the controller 160 may also control the brightness, tint, color, etc. of the processed video signal.

The controller 160 may also perform an OSD processing. For example, the controller 160 may generate a signal for displaying graphics or a text on the display 180. The generated signal may be input to the display 180 together with the processed video signal and data signal. The controller 160 may determine a rating by comparing stored facial information and voice information in the memory 175 with user's extracted facial information and voice information. In addition, the controller 160 may set a rating according to user input. The controller 160 may update the rating.

Referring to FIG. 1, the network interface unit 165 may transmit or receive data wirelessly or by a cable, for example, to and from local electronic devices within a short range, and may connect to the Interface. In accordance with an embodiment of the present invention, the network interface unit 165 may transmit or receive user's emotional information to or from other electronic devices or an external network server, under the control of the controller 160.

The memory 175 may store programs necessary for the controller 160 to process and control signals, and may also store processed video, audio and data signals. The memory 175 may also retain an emotional map illustrated in FIG. 5A. The emotional map 500 may include an emotion type table 510, a user table 520, a location table 530, a content table 540, a product table 550, and a cast table 560.

Referring to FIG. 5A, the emotion type table 510 tabulates quantitative numerical data of various emotional states of the user. For instance, each value representing an emotional state may be created by comprehensively quantifying facial information, voice information and a body signal indicative of the specific emotional state of the user. Here, the controller 160 may retrieve the pre-stored emotion type table 510, quantify emotional information of a user, and store the emotional information in the memory 175. Meanwhile, the memory 175 may store the emotion information generated based on the emotion type table 510 in combination with at least one of user information of the user table 520, location information of the location table 530, content information of the content table 540, product information of the product table 550 or cast information of the cast table 560.

Figure 5B:
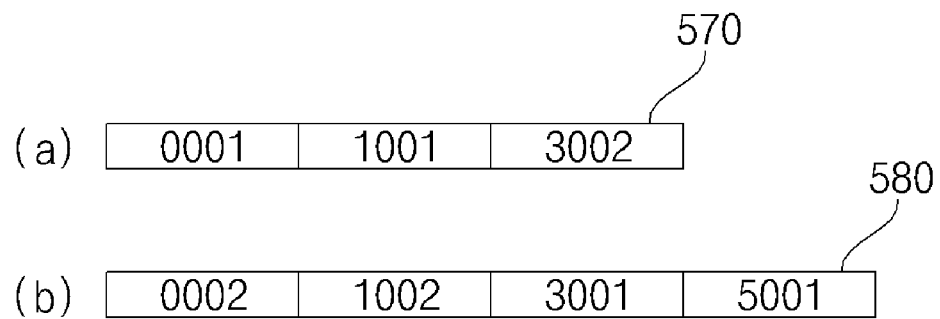
FIG. 5B illustrates a various emotional information file format using the emotional map illustrated in FIG. 5A.

FIG. 5B illustrates a various emotional information file formats using the emotional map illustrated in FIG. 5A. For example, as shown in FIG. 5B(a), emotional information file format 570 stored in memory 175 may include emotion information '0001' using the emotion type table 510, user information '1001' using the user table 520, and the content information '3002' using the content table 540. Also, as shown in FIG. 5B(b), emotional information file format 580 stored in memory 175 may include emotion information '0002' using the emotion type table 510, user information '1002' using the user table 520, content information '3001' using the content table 540, and cast information '5001' using the cast table 560. In addition to the above mentioned examples, variations of emotional information file formats may be generated within the scope of the present invention.

In addition, the emotional information may be time-stamped to indicate when the emotional information was generated for the reproduced content. Here, the representative emotional information may be stored based on the content. The emotional information may be stored in combination with at least one of the age, gender, location, or hobby of the user. In the case of a plurality of users, the emotional information may be stored in combination with information about the average age of the users. This combined emotional information may be included in the content or may be stored separately from the content.

To ensure compatibility with other electronic devices, each table may be standardized. If tables are created according to different standards, the tables may be converted between the standards. For example, if a table of a different standard is received from the network, the table may be converted suitably for the memory 175.

The memory 175 may transmit and/or the stored emotional information to another electronic device or a network server through the network interface unit 165, and store the received emotional information. For instance, content providers may build a database of emotional information by the content category, user, taste, age, region, gender, etc. in their servers.

Further, emotional information of users may be collected based on a particular content by sharing emotional information with other electronic devices or external servers. This content may be categorized by eliciting user's emotional response. Further, the representative emotional state for the content may be frequently updated based upon emotional responses of a plurality of users. Information about the representative emotional state for the content is transmitted to each electronic device and is provided to users viewing the content for use in comparison.

The content providers may receive the afore-described emotional information through the network interface unit 165. Since the emotional information is generated based on at least one of the captured image, the recorded voice, or the sensed body signal, the emotional information becomes more reliable.

Next, the memory 175 may also store at least one of attention information or emotional intensity information as well as emotional information of the user. The memory 175 may also temporarily store video, audio and/or data signal received from the external signal I/O unit 128. Additionally, the memory 175 may store broadcast channels using a channel add function. Further, while the memory 175 may be configured separately from the controller 160, the memory 175 may also be incorporated into the controller 160. The image display apparatus 100 may reproduce the content stored in the memory 175 (e.g. video files, still image files, music files, text files, and application files) to the user.

Referring to FIG. 1, the display 180 may convert a processed video signal, a processed data signal, and an OSD signal received from the controller 160 or a video signal and a data signal received from the external device I/O unit 128 into RGB signals, thereby generating drive signals. The display 180 may be various types of displays, such as a 3D display. The display 180 may also be a touch screen that can be used not only as an output device but also as an input device.

The audio output unit 185 may receive the processed audio signal (e.g. a stereo signal, a 3.1 channel signal or a 5.1 channel signal) from the controller 160 and output the received audio signal as sound. The audio output unit 185 may employ various speaker configurations.

The remote controller 200 transmits a user input to the user input interface unit 150. For transmission of the user input, the remote controller 200 may use various communication techniques such as Bluetooth, RF communication, InfraRed (IR) communication, Ultra WideBand (UWB) and ZigBee. Further, the remote controller 200 may include the body signal sensor 145. The remote controller 200 may also receive video, audio and data signals from the user input interface unit 150 and output the received signals.

Further, the image display apparatus 100 may be any of a TV receiver, a portable phone, a PC, a digital broadcasting terminal, a Personal Digital Assistant (PDA), a Portable Multimedia Player (PMP), etc. At least one of image display apparatuses illustrated in FIGS. 2, 3 and 4 may not include the tuner and the demodulator.

Next, the controller 160 may include an emotion decision module to determine the emotional state of a single user or the emotional states of a plurality of users based on image information, voice information and physical information received from the image capture unit 125, the voice recorder 135, and the body signal sensor 145. The emotion decision module may contain algorithms for determining the emotional state of a user based on each of a captured image, recorded voice, and a sensed body signal.

The emotion decision module may include an algorithm for collecting the emotional information of the user determined by each algorithm and finally determining the emotional state of the user based on the collected emotional information according to a predetermined criteria. The predetermined criteria may be user conditions such as a single user, a plurality of users, a user's motion, or external environmental conditions such as noise, luminance, temperature, humidity, etc. That is, the controller 160 may be a unit in which programs containing a variety of algorithms are stored and executed to extract, convert, store, and transmit information necessary to determine the emotional state of a user in addition to controlling various other components.

The block diagram of the image display apparatus 100 illustrated in FIG. 1 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Figure 6:
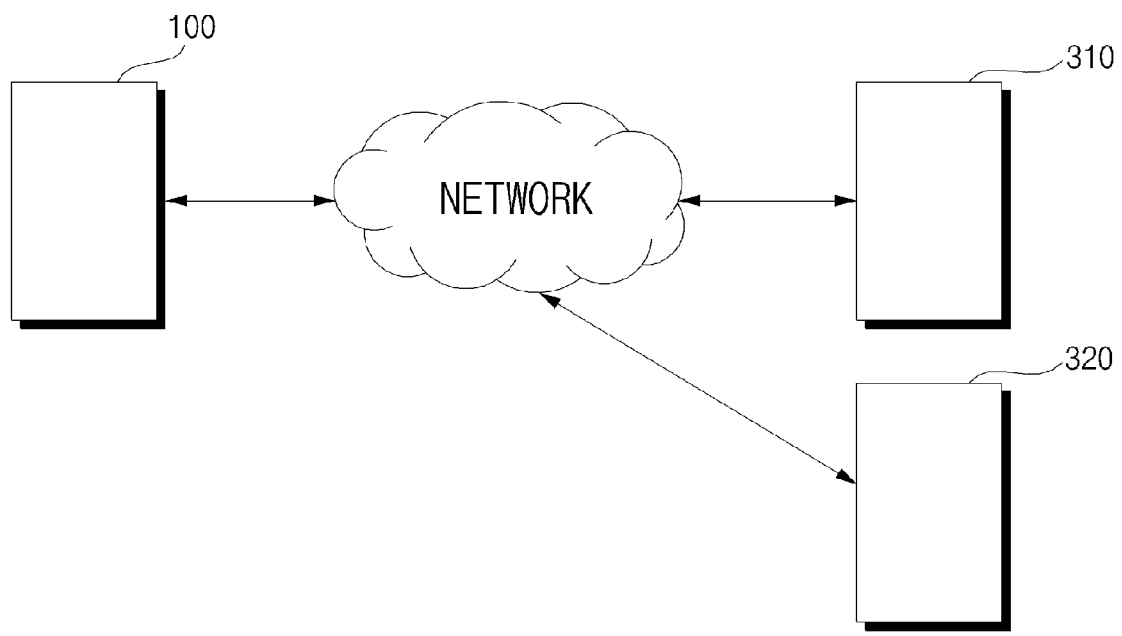
FIG. 6 illustrates the image display apparatus connected to a network.

FIG. 6 illustrates connections of the image display apparatus 100 illustrated in FIG. 1 to a network. Referring to FIG. 6, reference numerals 310 and 320 denote external devices. The image display apparatus 100 is capable of recommending or sharing content with the external devices 310 and 320. The external devices 310 and 320 may be local electronic devices within a short range, external servers, or content providers.

Figure 7:
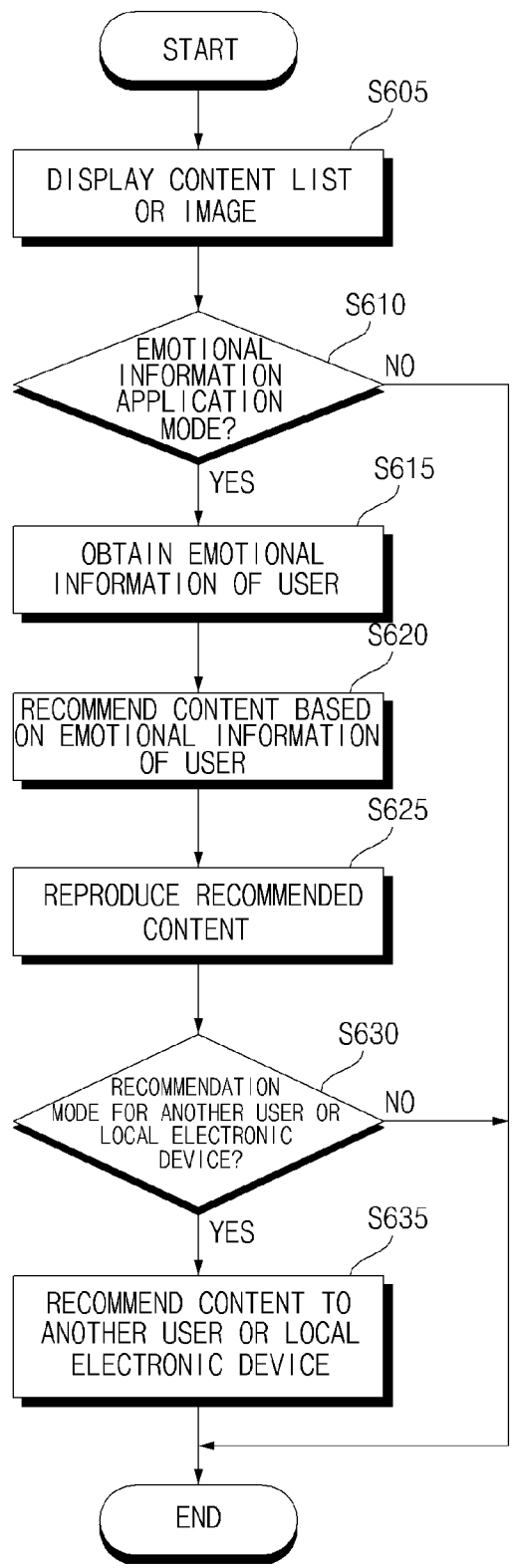
FIG. 7 is a flowchart illustrating a method for operating the image display apparatus according to an embodiment of the present invention.
Figure 8:
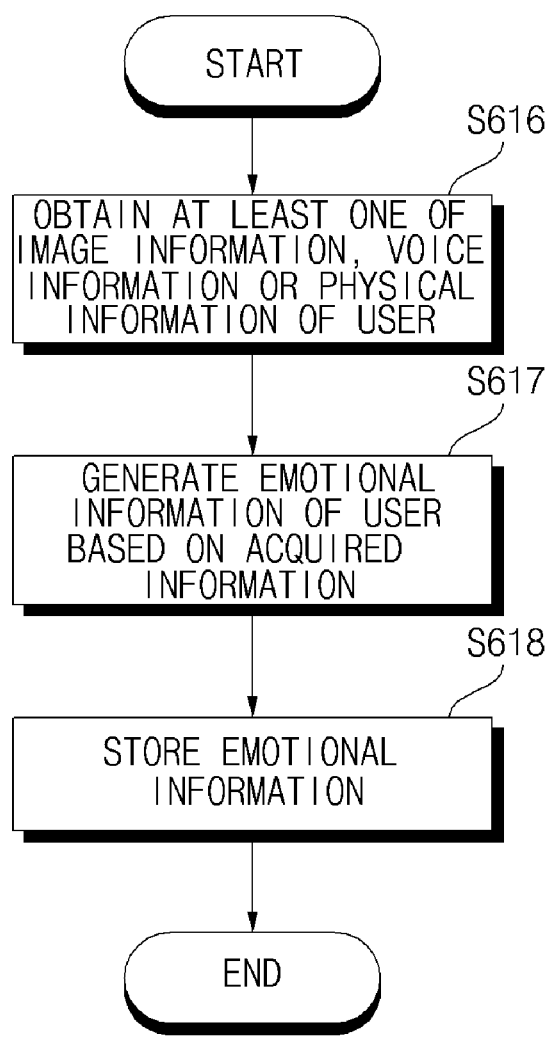
FIG. 8 is a detailed flowchart illustrating a step for obtaining emotional information in the method for operating the image display apparatus illustrated in FIG. 7.
Figure 9:
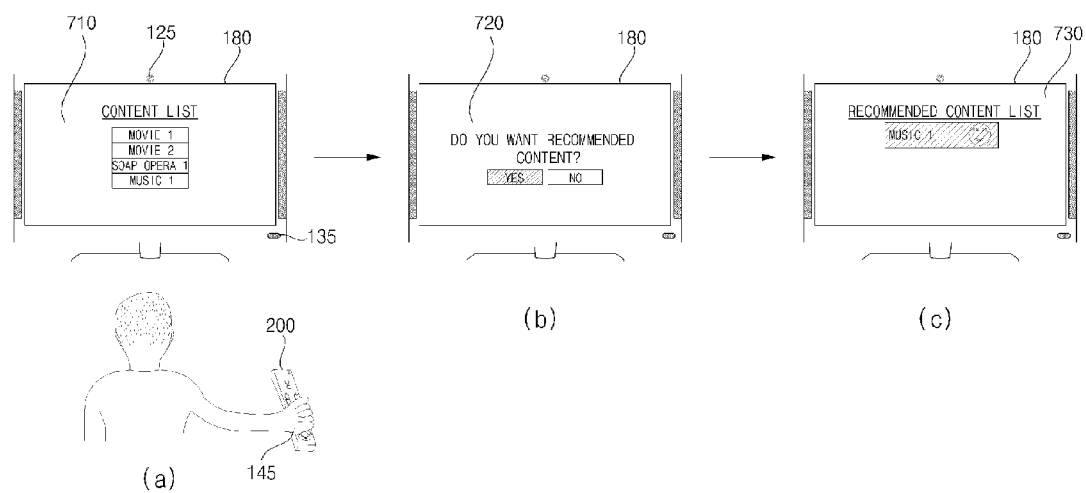
FIGS. 9 to 21 are views referred to for describing the image display apparatus for sharing content according to emotional information according to embodiments of the present invention.

FIG. 7 is a flowchart illustrating a method for operating the image display apparatus according to an embodiment of the present invention. FIG. 8 is a detailed flowchart illustrating a step for obtaining emotional information in the method for operating the image display apparatus illustrated in FIG. 7, and FIGS. 9 to 21 are views referred to for describing the image display apparatus for sharing content according to emotional information according to the embodiment of the present invention.

Referring to FIG. 7, the image display apparatus 100 displays a content list or reproduces a user-selected content (S605). The reproduced content may be any of an image content such as a movie, a soap opera, a sport game, a documentary, an image, etc., an audio content such as music, and a text content such as documents. The reproduced content also may be an external image received from an external device or a broadcast image obtained from a received broadcast signal.

During the content reproduction, information about the content may also be displayed. The content information may include at least one of the title, category or viewing duration (or viewed points in time) of the content, places seen in the content, cast members, latest news about the cast or products seen in the content. This content information may be stored using the emotion type table 510 retained in the memory 875. Thus, if the reproduced content has been saved as a favorite, the content information may be displayed when reproduced.

Then, the image display apparatus 100 determines whether an emotional information application mode has been set (S610). If the image display apparatus 100 is in the emotional information application mode, it obtains emotional information associated with the user (S615).

As illustrated in FIG. 9(b), the image display apparatus 100 enters the emotional information application mode, when the user selects 'YES' to an object 720 asking whether the user wants to view a recommended content according to the emotional information of the user displayed on the display 180. Further, alternatively or additionally, the image display apparatus 100 may automatically monitor the emotional state of the user, and if determining that the emotional state indicates a specific emotion, it may automatically enter the emotional information application mode, when reproducing content.

In accordance with an embodiment of the present invention, emotional information may be obtained by monitoring the current emotional state of the user or received from a local electronic device or a network server. Alternatively, pre-stored emotional information may be retrieved from the memory 175.

Referring to FIG. 8, the image display apparatus 100 obtains at least one of image information, voice information, or physical information of the user in order to generate emotional information of the user (S616). As described before, the image information, voice information and physical information of the user may be obtained respectively from the image capture unit 125, the voice recorder 135, and the body signal sensor 145.

Thereafter, the image display apparatus 100 generates emotional information of the user based on the collected information (S617). Here, the controller 160 generates the emotional information of the user by combining the image information, voice information and physical information. Specifically, the controller 160 may assign different weights to the image information, voice information and physical information, for generation of the emotional information. When a plurality of users is present, the controller 160 may generate the emotional information of the individual users and determine representative emotional information of the users based on the individuals' emotional information. In addition to the emotional information, emotional intensity information or attention information may be generated.

Figure 10A:
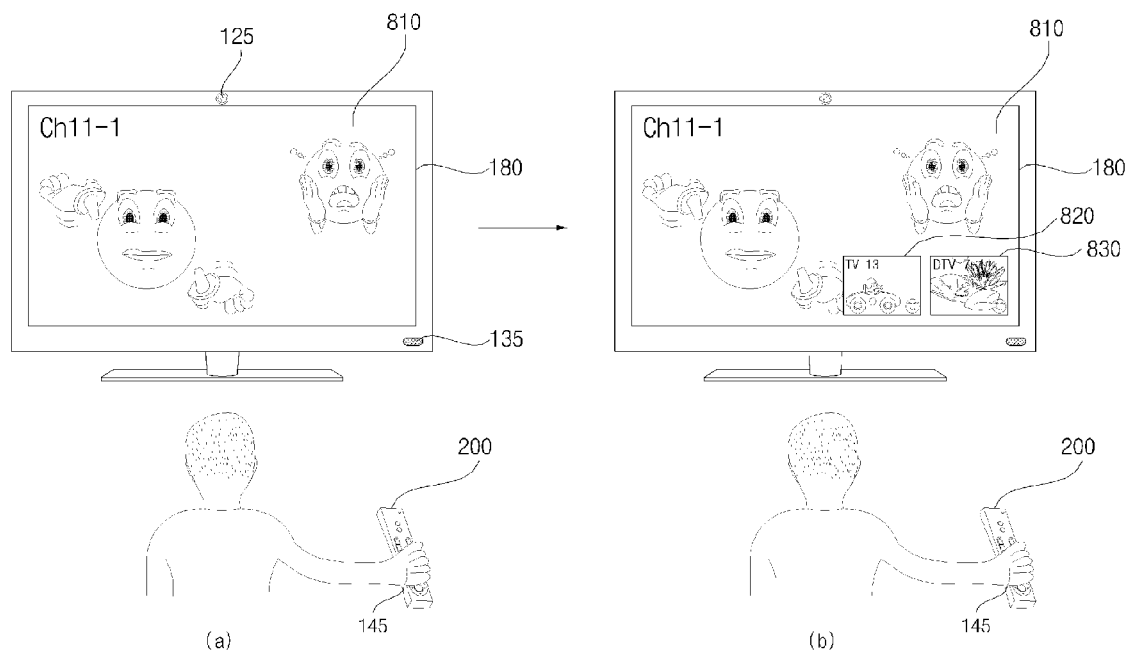

When content list screens 710 and 1910 are displayed as illustrated in FIGS. 9(a) and 19(a) or when content-related images 810, 910, 1010, 1110, 1510, 1610, 1710, 2010 and 2110 are displayed on the display 180 as illustrated in FIGS. 10A(a), 10B(a), 11(a), 12(a), 13(a), 15(a), 16(a), 17(a), 20(a) and 21(a), the controller 160 may obtain emotional information in the above-described manner. Once the emotional information of the user based on the collected information, the image display apparatus 100 stores the emotional information (S618).

Referring to FIG. 7, the image display apparatus determines the content to be recommended for the user among a plurality of contents using the emotion information associated with the user (S620). The recommended content may be any one of image content such as movies, soap operas, sport games, documentaries, and images, audio content such as music, and text content such as documents. For example, referring to FIG. 9(c), a list 730 of recommended contents according to the emotional information of the user is displayed on the display 180. The content list 730 may include a plurality of recommended content items.

While content may be recommended upon transitioning to the emotional information application mode as illustrated in FIG. 9(b), many other options are available. For example, the content may be recommended upon user selection of a specific emotion in an emotion menu or on a pre-scheduled time or date. It is also possible to recommend content, when the image display apparatus 100 is turned on. In this case, upon power-on of the image display apparatus 100, at least one of the image capture unit 125, the voice recorder 135, or the body signal sensor 145 is automatically operated in order for the controller 160 to obtain and determine the emotional state of the user. Further, when the user turns on the image display apparatus 100, the content recommendation may be performed according to a preset condition, for example, the contents corresponding to 'joy' may be recommended by default.

Further, the recommended content may be represented as thumbnail images. Referring to FIG. 10A(b), recommended contents, such as recommended broadcast programs are represented as thumbnail images 820 and 830.

Figure 10B:
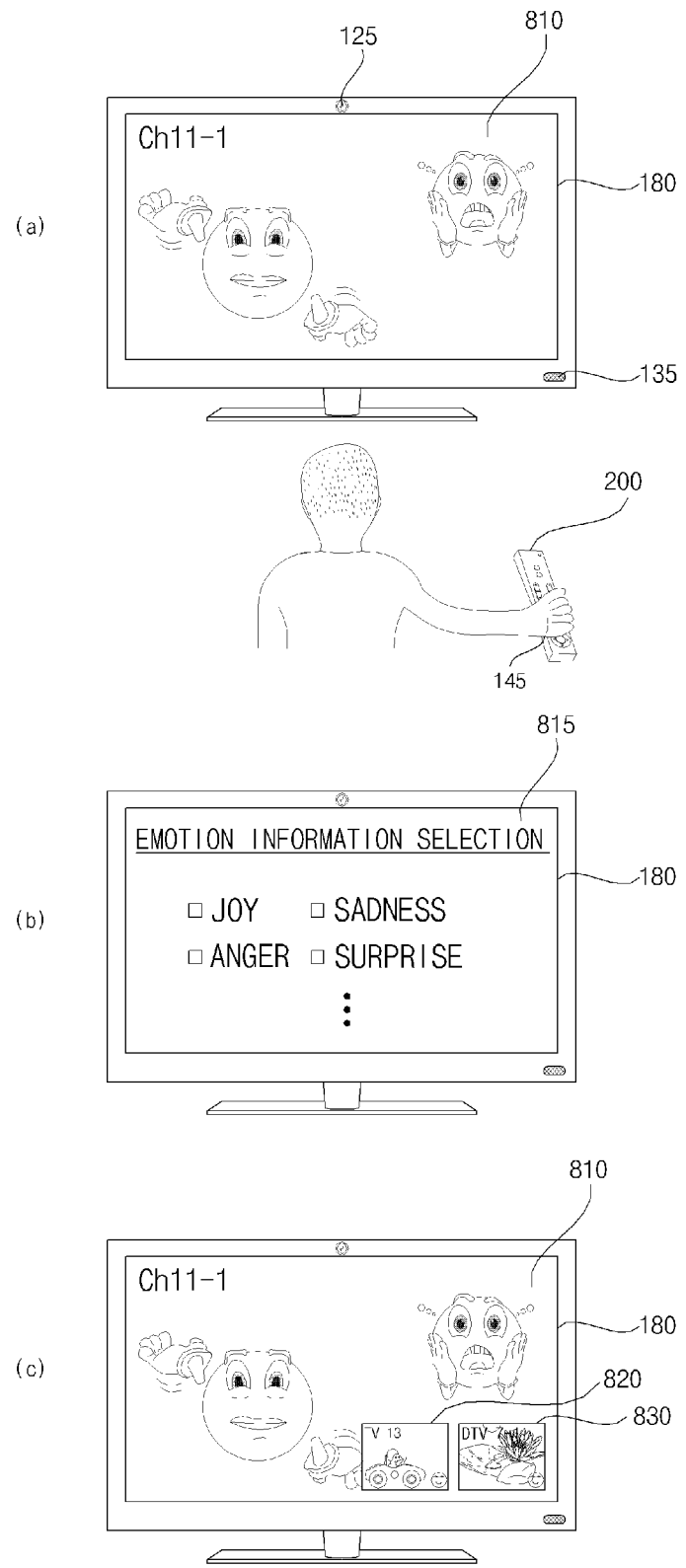

Meanwhile, the operation illustrated in FIG. 10B is similar to the operation illustrated in FIG. 10A, except that the emotion information selection menu 815 is displayed in the display 180, before the recommended content are represented as thumbnail images. Referring to FIG. 10B, the emotion information selection menu 815 may include a 'joy' item, a 'sadness' item, an 'anger' item, a 'surprise' item, and so on. Thus, the user may select the type of emotion information to be used in selecting recommended contents to be displayed. Meanwhile, the recommended content may also be automatically represented as thumbnail images.

Figure 12:
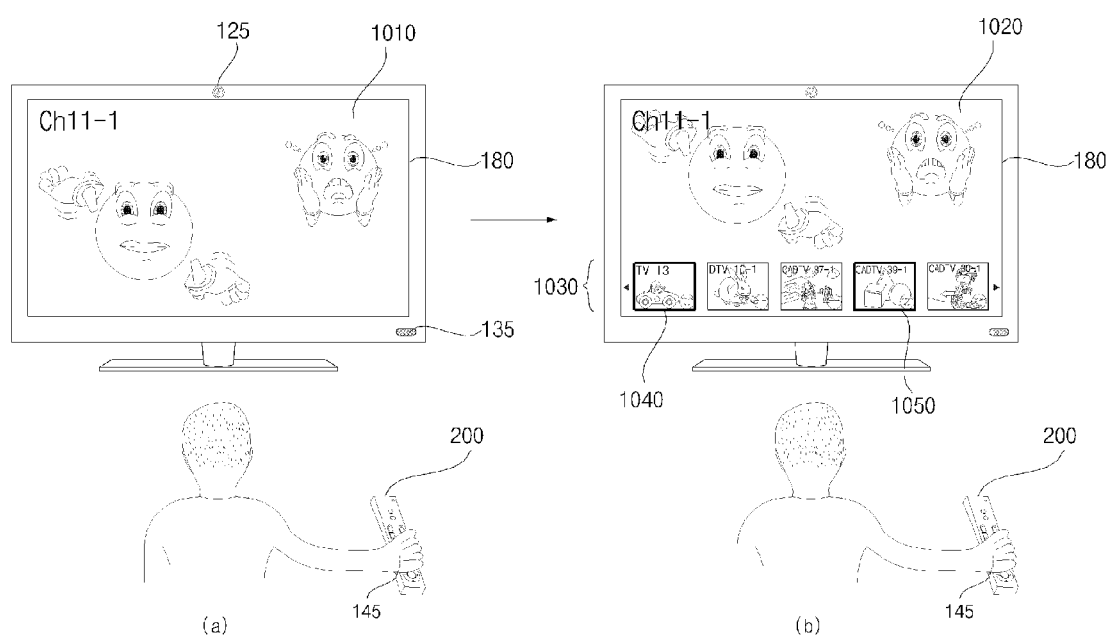

On the other hand, referring to FIG. 12(*b*), a thumbnail list 1030 including both thumbnail images 1040 and 1050 corresponding to the recommended contents, and thumbnail images that are not recommended may be displayed. As shown in FIG. 12(*b*), the thumbnail images 1040 and 1050 corresponding to the recommended contents may be highlighted or focused upon in a different size, brightness or color, in comparison to other thumbnail images in the thumbnail list 1030. The thumbnail images of the thumbnail list 1030 may be still images or moving pictures.

Figure 13:
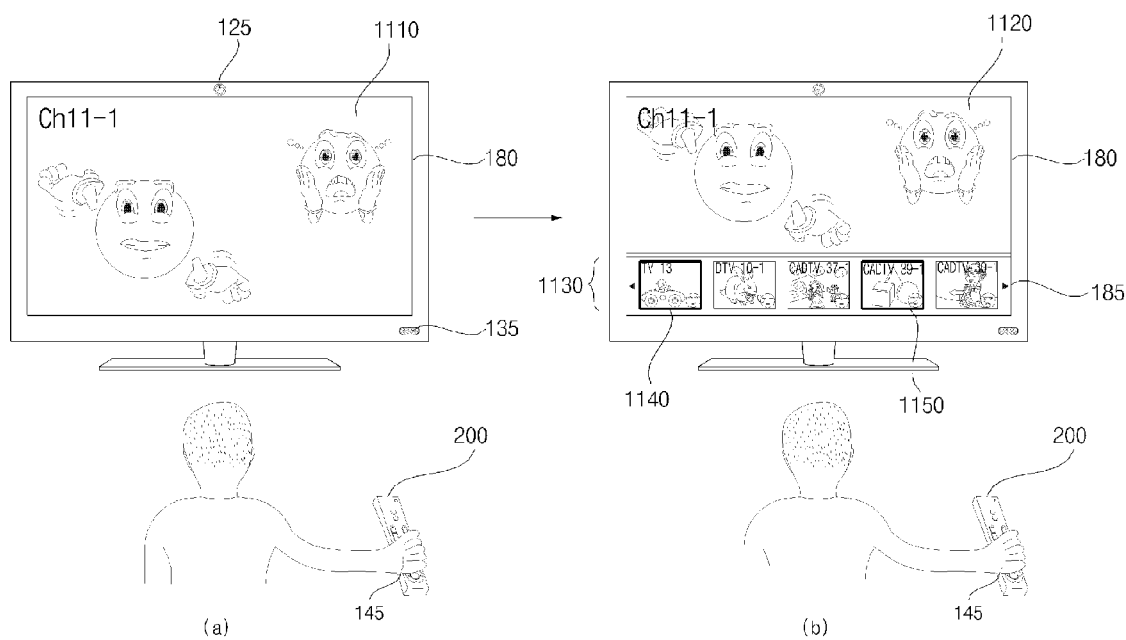

FIG. 13(*b*) is similar to FIG. 12(*b*), except that the thumbnail list 1130 is displayed in a subdisplay 185. The subdisplay 185 is distinguished from the display 180 physically or in hardware. Whereas the display 180 may display reproduced images, the subdisplay 185 may display a subtitle, a channel list, additional information, etc. The subdisplay 185 may also communicate with the display 180 wirelessly or by cable.

Further, the thumbnail images 1040 and 1050 illustrated in FIG. 12(*b*) and the thumbnail images 1140 and 1150 illustrated in FIG. 13(*b*) may correspond to a scene of a frame of each content that elicits the strongest emotional response from the user or that elicits strongest emotional responses from a plurality of users. Accordingly, the user can rapidly identify an emotion that content to be reproduced may convey.

Figure 11:
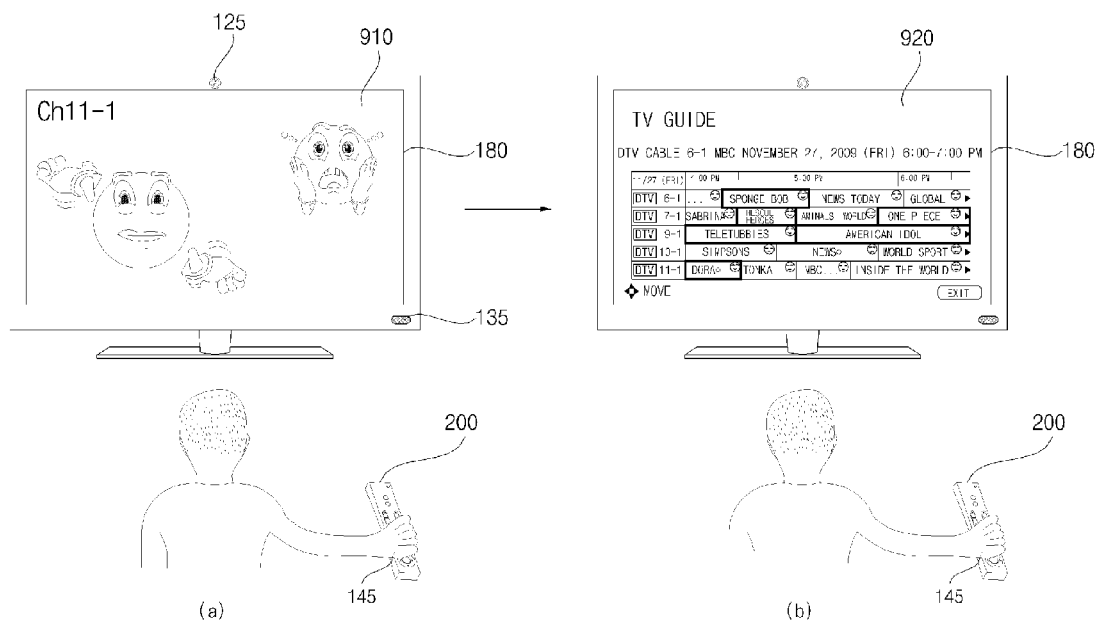

Content recommendation may be performed using an Electronic Program Guide (EPG). When an EPG is displayed, specific broadcast programs may be recommended according to emotional information of a user. Referring to FIG. 11(*b*), specific broadcast programs are recommended on an EPG screen 920 on the display 180 according to the current emotional information of the user or emotional information selected by the user. The recommended broadcast programs may be highlighted or focused upon in a different size, brightness or color. Further, the recommended broadcast programs may be indicated using objects representing emotion information for the broadcast programs, for example, an image object and a text object. The image object graphically represents a specific emotion and the text object indicates at least one of a specific emotion, an attention level or an emotional intensity level.

In accordance with an embodiment of the present invention, upon a user selection of a specific broadcast program from the EPG displayed on the display, details of emotional information set for the selected broadcast program may be provided on an emotional information screen. The details of emotional information may include representative emotional information, an emotional intensity, an emotional curve, ratios of emotions, attention information, an emotion-based rating, etc.

Referring to FIG. 7, the image display apparatus 100 then selectively or automatically reproduces the recommended content (S625). As illustrated in FIG. 10(*b*), 12(*b*) or 13(*b*), the recommended contents may be represented as thumbnail images 820 and 830, 1040 and 1050, or 1140 and 1150. Upon selection of one of the thumbnail images, an image corresponding to the selected thumbnail image may be displayed on the display 180. On the other hand, an image corresponding to the thumbnail image in accordance with the pre-set condition or the selected emotion may automatically be displayed on the display 180.

Next, the image display apparatus determines whether a recommendation mode has been set to recommend content to another user or a local electronic device (S630). When the recommendation mode has been set, the image display apparatus recommends or shares specific content with another user or the local electronic device (S635).

If the emotional intensity of the user reaches a predetermined level or higher while viewing a specific content, the specific content may be automatically recommended to another user or the local electronic device. In addition, if the image display apparatus 100 accesses a network, the specific content may be automatically recommended to another user or the local electronic device. Further, the content recommendation to another user or the local electronic device may be performed, once the user selects to enter the recommendation mode. In addition, another user or the local electronic device to which content is to be recommended may be pre-registered for sharing emotional information. For example, another user may be registered through a chatting software and another local electronic device such as a multimedia player such as a mobile phone, PMP, PDA, PC, broadcast receiver, etc.

A content list containing emotional information illustrated in FIGS. 11, 12 and 13 may provide a sorting function by an emotion type, an emotional intensity level, or an attention level. Therefore, the user can conveniently sort content according to a desired sorting criterion.

Figure 14:
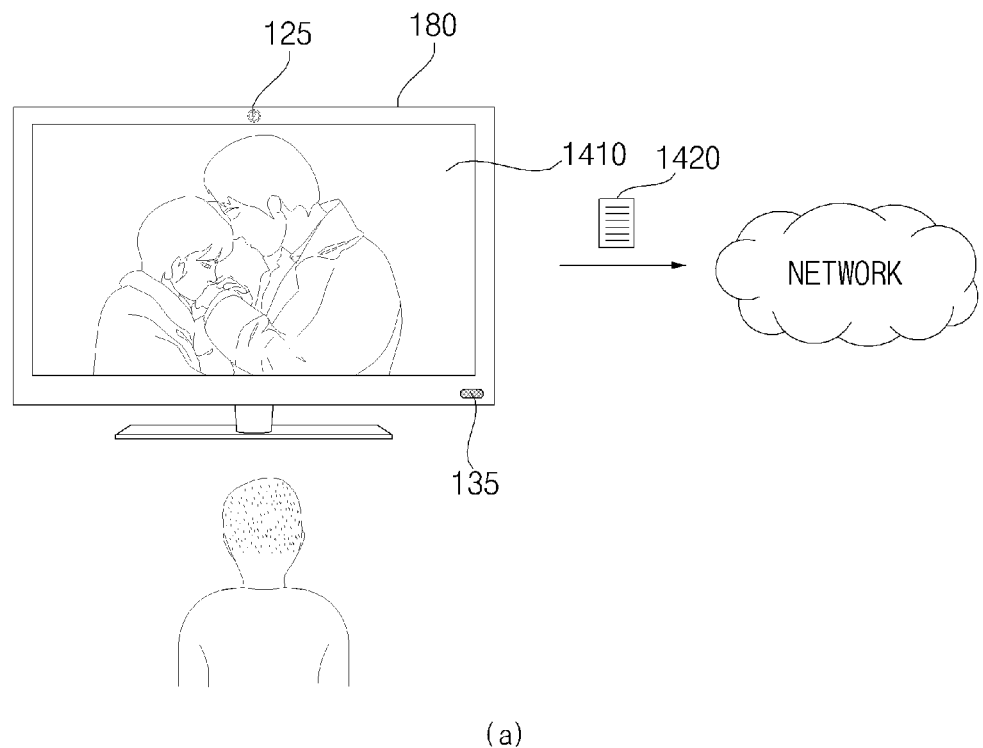
Figure 14:
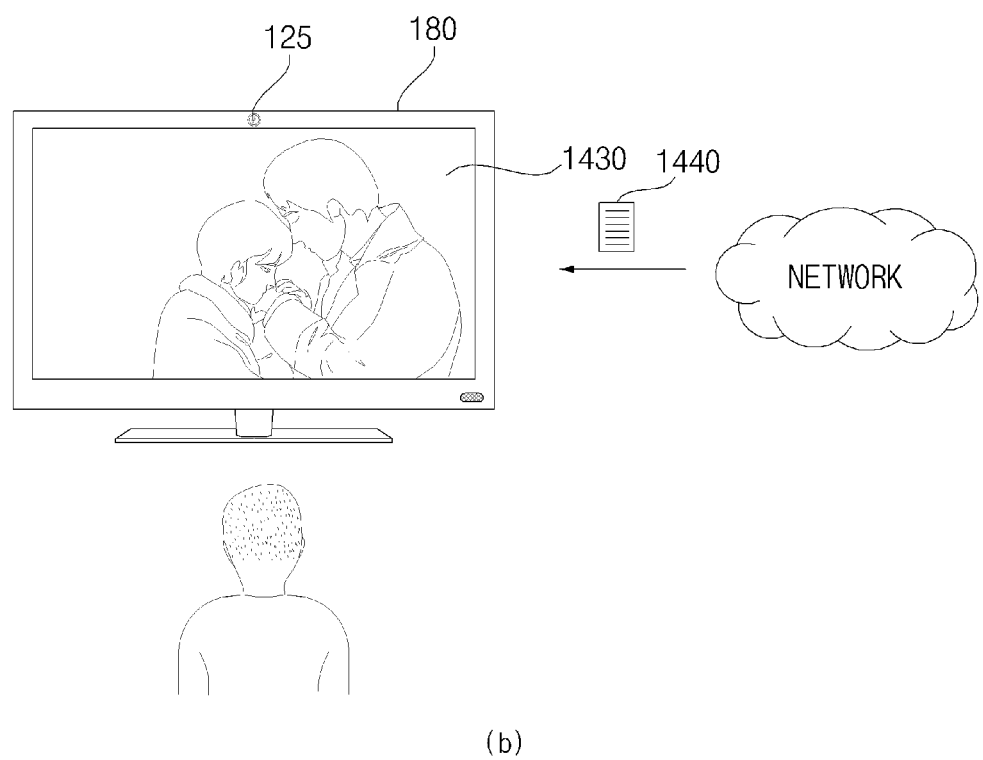

FIG. 14 illustrates an operation for accessing the network and transmitting or receiving data over the network in the image display apparatus 100.

Referring to FIG. 14(*a*), while the user is viewing an image 1410, the image display apparatus 100 may transmit information about the reproduced content (e.g. a title, a channel number, an airing time, a Uniform Resource Locator (URL), etc.), user information (e.g. an Identifier (ID)), emotional information of the user (representative emotional information in case of a plurality of users), emotional intensity information of the user, and/or attention information of the user to another user or a remote server over the connected network, as indicated by reference numeral 1420.

Referring to FIG. 14(*b*), on the other hand, while the user is viewing an image 1430, the image display apparatus 100 may receive from another user or a remote server information about reproduced content (e.g. a title, a channel number, an airing time, a URL, etc.), user information (e.g. an ID), and/or information about recommended content related to emotional information of the transmitting user, over the connected network, as indicated by reference numeral 1440. The information about the recommended content may take the form of a list in which the recommended content is listed in conjunction with emotional information of the transmitting user.

Figure 15:
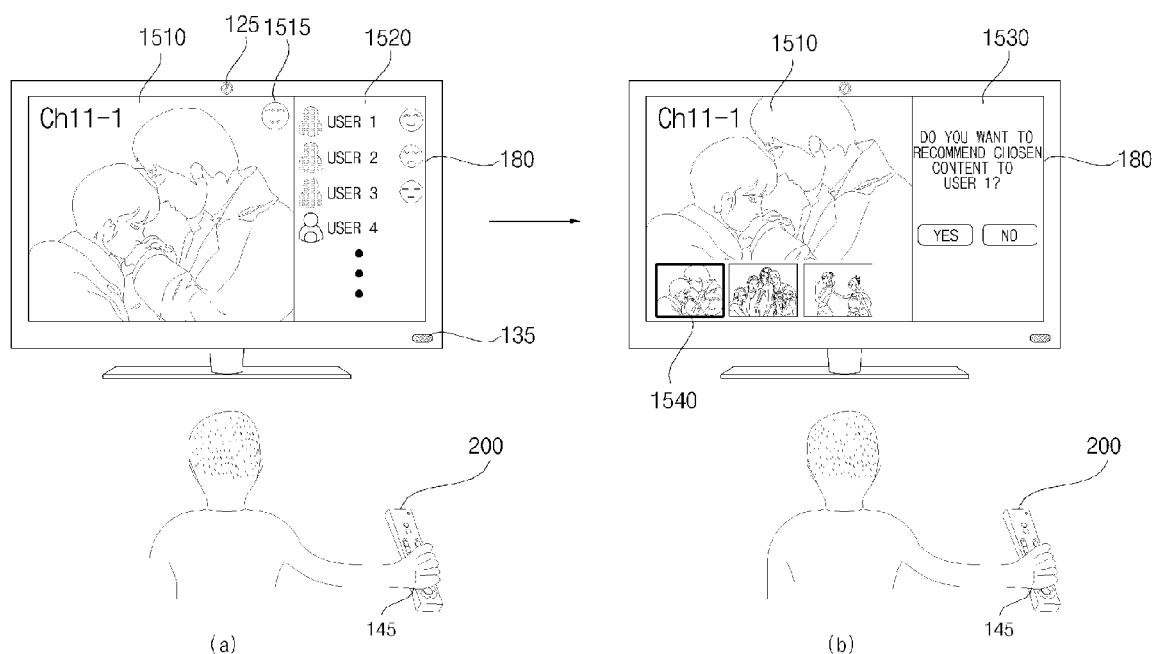

FIG. 15(*a*) illustrates an example of displaying objects 1520 that represent other users within the network and their emotional states on the display 180. That is, the image display apparatus may display emotion information for one or more other user at different apparatus within the network on the screen of the image display apparatus 100. An object 1515 representing the emotional state of the user of the image display apparatus 100 may additionally be displayed on the display 180. Therefore, the user of the image display apparatus 100 may readily compare his or her emotional state with the emotional states of other users at different apparatus. As such, the user may easily recommend a desired content to the other users.

Referring to FIG. 15(*b*), once the user selects one of the other users for the content recommendation, the image display apparatus 100 may display an object 1530 asking whether to recommend an user-selected content 1540 to the selected user. That is, the image display apparatus 100 may receive the current user's recommendation for a specific content among a plurality of different contents based on the displayed emotion information, and may also transmit the current user's recommendation to another user at another apparatus.

Herein, the content recommendation may refer to a transmission of content information (e.g. a title, a channel number, an airing time, a URL, etc.) or a transmission of content itself Meanwhile, when an object representing a user 1 is selected in FIG. 15(*a*), information about content that the user 1 preserves (titles, channel numbers, airing times, URLs, etc.) or emotional information of the user 1 regarding each content item may be displayed. Accordingly, the user of the image display apparatus 100 can easily identify emotional information of each of other registered users.

Figure 16:
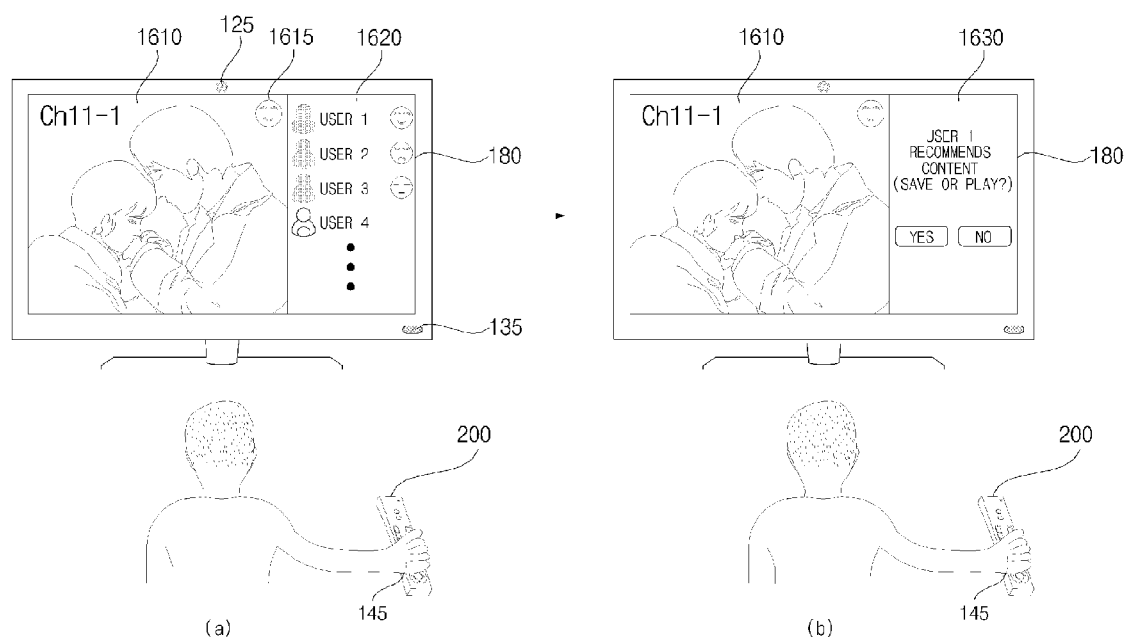

FIG. 16 is similar to FIG. 15, except that another user of the network recommends a content to the user of the image display apparatus 100. If emotional information of the user of the image display apparatus 100 is shared with another user of the network and another user of the network recommends the content to the user of the image display apparatus 100, the image display apparatus 100 may display an object 1630 notifying that another user of the network has recommended content, as illustrated in FIG. 16(*b*).

Furthermore, when the user views an image, the content provider may recommend a specific content to the user according to emotional information or emotional intensity information. For instance, the content provider may receive the emotional information selected by the user or the current emotional information of the user and recommend the content with emotional information or emotional intensity information matching to the received emotional information or emotional intensity information by a predetermined rate or higher.

Figure 17:
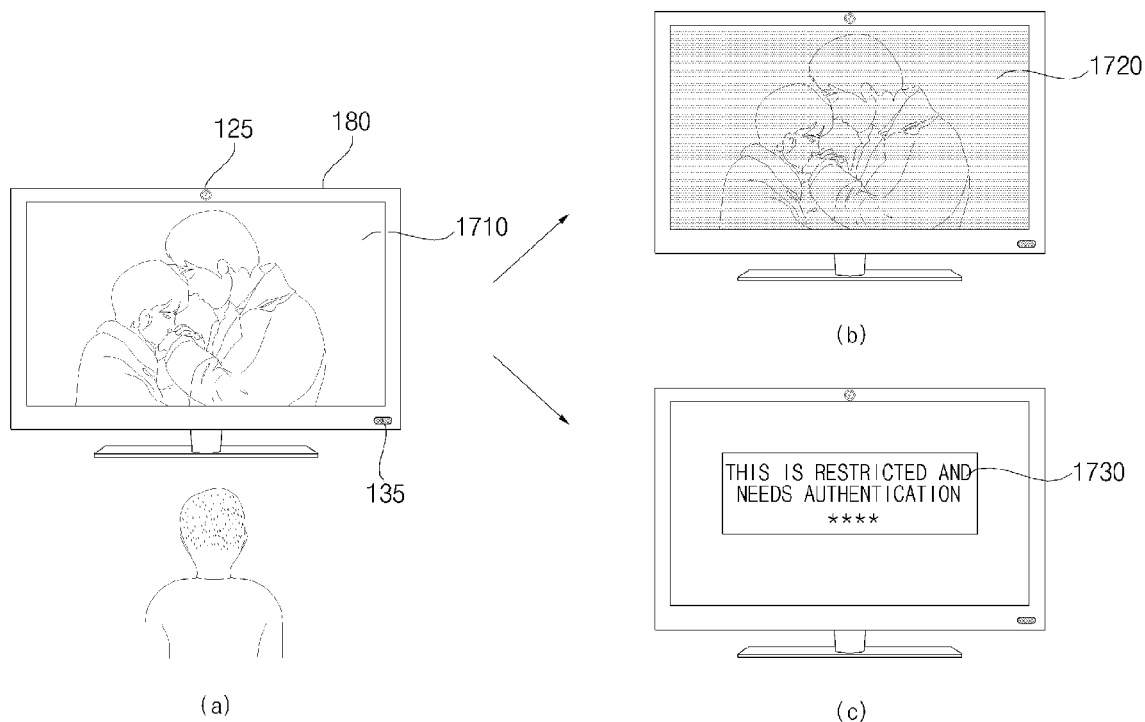

FIG. 17 illustrates a content reproduction based on emotional intensity information. Referring to FIG. 17, with an image 1710 displayed on the display 180, the controller 160 may generate emotional intensity information of the user based on at least one of image information, voice information or physical information of the user, in addition to emotional information of the user. For example, a loud voice (e.g. voice with increased volume or intensity), a body movement, bushing, clapping hands, covering eyes with hands, or crying may be interpreted as an intense display of the user's emotion. Alternatively, the emotional intensity may be correlated to the relative distances between facial feature points. If the relative distances between the facial feature points become smaller or larger than when the user is expressionless, it can be inferred that the user is emotionally intense.

Figure 18:
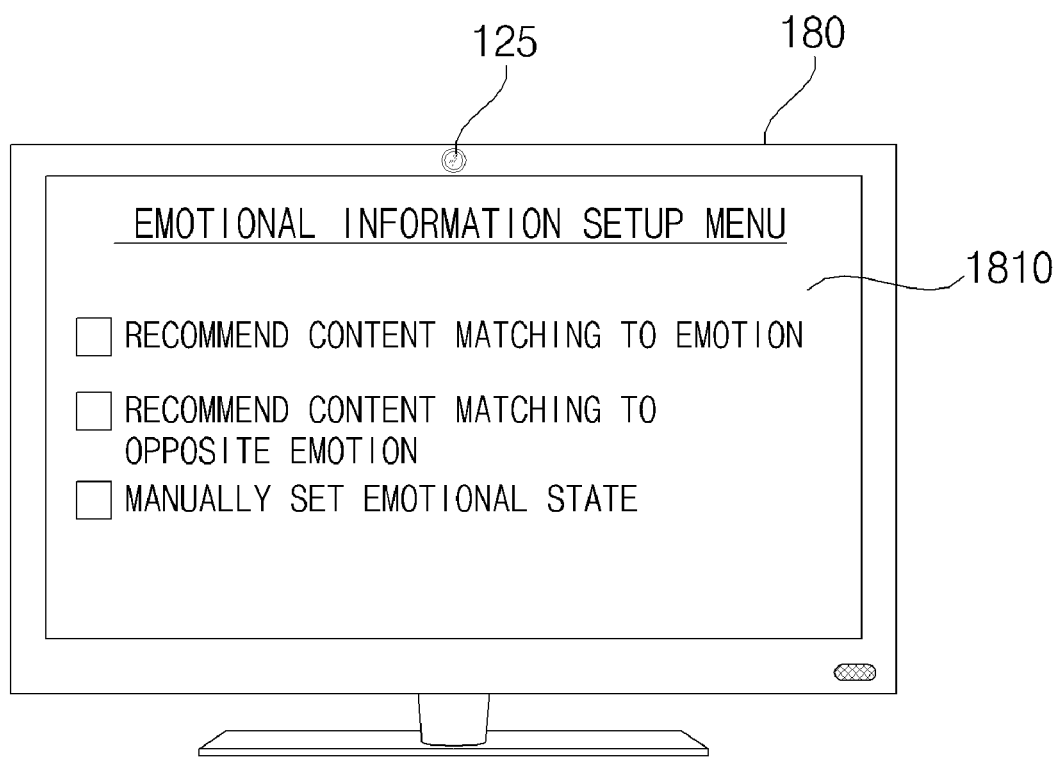

FIG. 17(*a*) illustrates an embodiment of the present invention in which the user feels an intense emotion. If the user moves his or her arms or legs while viewing the image 1710, it can be inferred that the image 1710 is eliciting a strong emotional response from the user. That is, a stronger emotional response than if the user remains still. If the emotional intensity equals or exceeds an allowed value, the reproduced content may be scrambled and thus a scrambled image 1720 may be displayed as illustrated in FIG. 17(*b*). Alternatively, as illustrated in FIG. 17(*c*), the image display apparatus 100 may display an object 1730 notifying that the content is restricted and needing an authentication, or the image display apparatus 100 may be powered off FIG. 18 illustrates an embodiment of the present invention having an emotional information setup menu. The image display apparatus 100 may recommend the contents that match an emotion represented by the emotional information of the user or match an emotion opposite to the emotional represented by the emotional information of the user. Alternatively, the user may manually enter the emotional state to receive recommended contents. The emotional information setup menu having these options may be displayed on the display 180, as illustrated in FIG. 18.

Referring to FIG. 18, the emotional information setup menu may include menu items 'recommend content matching to emotion', 'recommend content matching to opposite emotion', and 'manually set emotional state', etc. A content recommendation condition may be set by selecting a checker box beside an intended menu item. Many other options may be available in the emotional information setup menu. For example, an emotional intensity threshold or an attention threshold may be set to recommend only contents exceeding the threshold, or a specific time may be scheduled for the content recommendation.

Figure 19:
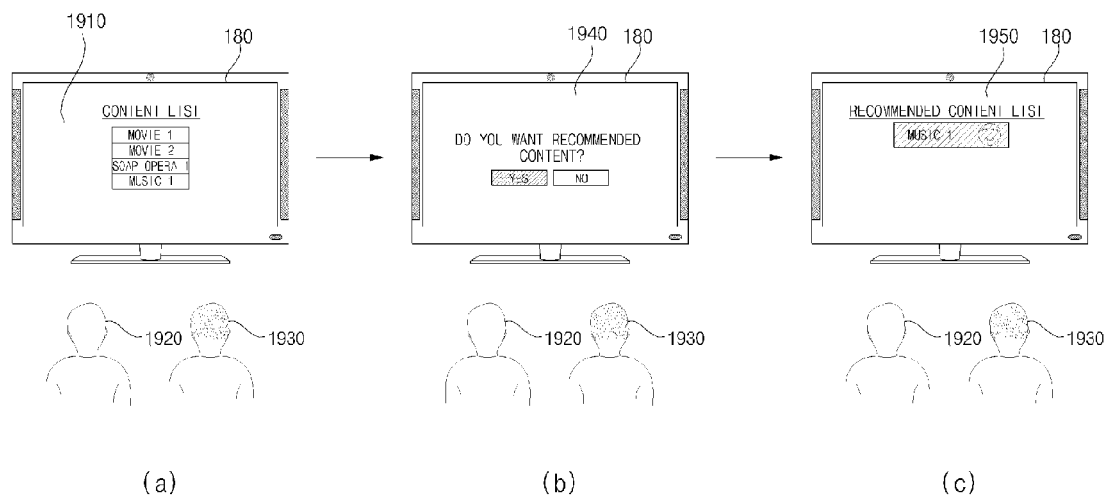

FIG. 19 illustrates an embodiment of the present invention recommending contents to a plurality of users 1920 and 1930. Referring to FIG. 19(*a*), with a content list screen 1910 displayed on the display 180, emotional information of the users 1920 and 1930 may be obtained. Referring to FIG. 19(*b*), the image display apparatus 100 displays an object 1940 asking whether to recommend content. Upon user selection of a positive answer in the object 1940, the emotional information application mode may be entered. Referring to FIG. 19(*c*), a recommended content list 1950 is displayed according to the representative emotional information of the users 1920 and 1930. While the recommended content list 1950 includes a single content item, a plurality of content items may be listed in the content list 1950. As mentioned earlier, the representative emotional information of a plurality of users may be generated by assigning different weights to the users, especially according to the category of reproduced content.

Figure 20:
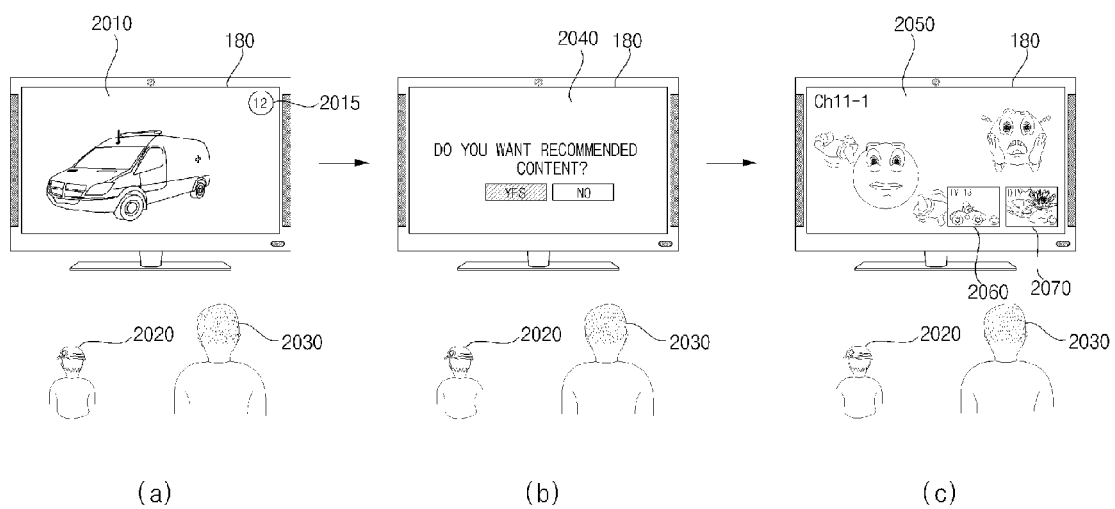

FIG. 20 illustrates an embodiment of the present invention where a plurality of users 2020 and 2030 view an image 2010. Depending on the category of the reproduced content, different weights may be assigned to the users 2020 and 2030, emotional information of the users 2020 and 2030 may be weighted with the different weights, and then information about a representative emotion that the reproduced content elicits from the users 2020 and 2030 may be generated based on the weighted emotional information.

Referring to FIG. 20(*a*), the image display apparatus 100 displays an object 2015 indicating that the image 2010 is appropriate for children age 12 and under on the reproduced broadcast image 2010. When the users 2020 and 2030 are a child and an adult, respectively, representative emotional information of the child 2020 and the adult 2030 may be generated by assigning a higher weight to emotional information of the child 2020 than to emotional information of the adult 2030. Alternatively, the representative emotional information may be generated based on the emotional information of the child 2020 alone. Further, if the content restricted to audiences age 19 and above is displayed, the representative emotional information is created based on the emotional information of the adult 2030 alone.

Referring to FIG. 20(*b*), the image display apparatus 100 displays an object 2040 asking whether to recommend content on the display 180. Upon user selection of a positive answer in the object 2040, the image display apparatus 100 enters into the emotional information application mode. Thereafter, referring to FIG. 20(*c*), thumbnail images 2060 and 2070 of the recommended contents may be displayed in addition to an image 2050 corresponding to the reproduced content, thereby increasing user convenience.

Figure 21:
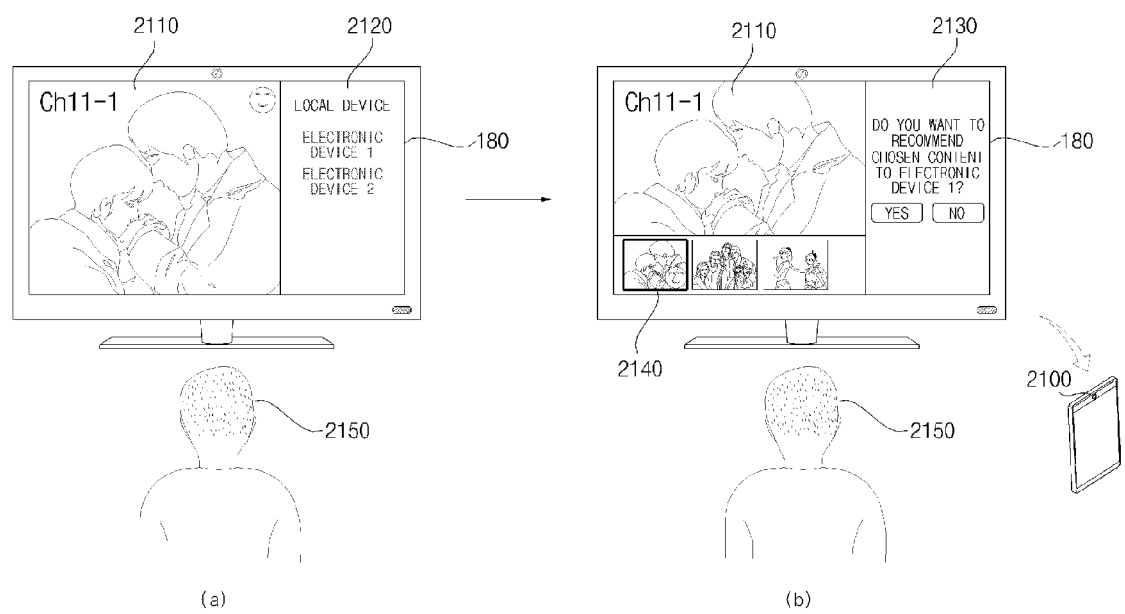

FIG. 21 illustrates another embodiment of the present invention where the image display apparatus 100 is recommending a specific content to a local electronic device (e.g. a PC) near the image display apparatus 100.

Referring to FIG. 21(*a*), a list 2120 of local devices capable of communicating with the image display apparatus 100 may be displayed along with an image 2110 on the display 180.

Referring to FIG. 21(b), once the user selects a specific local device and a content 2140, the image display apparatus 100 displays an object 2130 asking whether to recommend the selected content 2140 to a local electronic device 1 on a part of the display 180. Thus, the user 2150 can easily recommend a content to a local electronic device. Reversely, an electronic device 2100 may recommend a content to the image display apparatus 100. In this manner, the content can be recommended based on emotional information of the user. Therefore, an interaction is enabled between electronic devices or between users, thereby increasing user convenience.

As is apparent from the above description of embodiments of the present invention, because content can be recommended to a user according to emotional information of the user, user convenience is increased. Users can recommend content to each other over a network. Thus various user-friendly services can be provided. Emotional information of a user of an image display apparatus or emotional information of other users connected to a network is displayed on the image display apparatus. Therefore, the emotional state of the user of the image display apparatus or the emotional states of other users can be readily identified. Since reliable emotional information of a user is generated based on at least one of a captured image, recorded voice or a sensed body signal of the user, various user-friendly services can be provided.

The image display apparatus and a method for operating the same according to the foregoing embodiments are not restricted to the embodiments set forth herein. Therefore, variations and combinations of the embodiments set forth herein may fall within the scope of the present invention.

The method for operating the image display apparatus according to the foregoing embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage and a carrier wave (e.g., data transmission over the Internet). The computer-readable recording medium can be distributed over a plurality of computer systems connected to a network so that computer-readable code is written thereto and executed therefrom in a decentralized manner. Programs, code and code segments to realize the embodiments herein can easily be realized by one of ordinary skill in the art.

While the present invention has been particularly shown and described with reference to embodiments thereof, it will be understood by those of ordinary skill in the art that various changes in form and details may be made therein without departing from the spirit and scope of the present invention as defined by the following claims.

What is claimed:

1. A method for controlling an image display apparatus, the method comprising:
   obtaining voice information via a voice recorder of the image display apparatus;
   obtaining physical information via a body signal sensor of the image display apparatus;
   obtaining, via an image capturing unit of the image display apparatus, image information by capturing via a depth camera included in the image capturing unit, a particular user's face, extracting coordinates of the captured user's face, and capturing via an RGB camera included in the image capturing unit, facial expressions based on the extracted coordinates, the image information being extracted from the captured facial expressions;
   respectively storing, in a database of the image display apparatus, the image information, the voice information, and the physical information for a plurality of users including the particular user;
   storing, in the database, emotional information for the plurality of users, respectively, the emotional information including content categories preferred by each of the plurality of users;
   determining an emotional state of the particular user using the image information extracted from the captured facial expressions, the voice information, and the physical information of the particular user, the emotional information associated with the particular user including the determined emotional state;
   determining a content to be recommended for the particular user from among a plurality of different contents, based on both the determined emotional state and the preferred content categories associated with the particular user; and
   selectively or automatically displaying, on a display screen of the image display apparatus, the recommended content that is based on both the determined emotional state and the preferred content categories associated with the particular user.

2. The method of claim 1, wherein the displaying step selectively displays, on the display screen, multiple recommended contents based on a user input.

3. The method of claim 1, wherein the determining the emotional state includes:
   assigning different weights to the obtained image information, voice information, and physical information depending on attributes of the particular user or a preset condition; and
   combining the different weights assigned to the obtained image information, voice information, and physical information.

4. The method of claim 1, further comprising:
   displaying, on the display screen, a list of multiple recommended contents.

5. The method of claim 1, further comprising:
   displaying, on the display screen, thumbnails of the plurality of different contents simultaneously with a content-related image.

6. A method for controlling an image display apparatus, the method comprising:
   obtaining voice information via a voice recorder of the image display apparatus;
   obtaining physical information via a body signal sensor of the image display apparatus;
   obtaining, via an image capturing unit of the image display apparatus, image information by capturing via a depth camera included in the image capturing unit, a particular user's face, extracting coordinates of the captured user's face, and capturing via an RGB camera included in the image capturing unit, facial expressions based on the extracted coordinates, the image information being extracted from the captured facial expressions;
   respectively storing, in a database of the image display apparatus, the image information, the voice information, and the physical information for a plurality of users including the particular user;
   storing, in the database, emotional information for the plurality of users, respectively, the emotional information including content categories preferred by each of the plurality of users;
   determining an emotional state of the particular user using the image information extracted from the captured facial expressions, the voice information, and the physical information of the particular user, the emotional information associated with the particular user including the emotional state;

displaying, on a display screen of the image display apparatus of the particular user, one or more instances of emotional information for one or more users at one or more other image display apparatuses;

receiving, at the one or more other image display apparatuses, a first recommendation of the particular user for a recommended content among a plurality of different contents based on both the determined emotional state and the preferred content categories associated with the particular user; and transmitting, to another apparatus, the first recommendation.

7. The method of claim 6, further comprising:

transmitting, to another user among the one or more users at the one or more other image display apparatuses, at least one instance of current emotional information of the particular user;

receiving, at the image display apparatus of the particular user, a second recommendation of the another user for another recommended content among the plurality of different contents based on the transmitted at least one instance of current emotional information of the particular user; and displaying, on the display screen, the second recommendation.

8. The method of claim 6, further comprising:

displaying, on the display screen of the image display apparatus of the particular user, a thumbnail list of the plurality of different contents.

9. The method of claim 6, further comprising:

transmitting, to a content provider, at least one instance of current emotional information of the particular user;

receiving, at the image display apparatus from the content provider, a third recommendation for a third content among the plurality of different contents based on the transmitted at least one instance of current emotional information of the particular user; and displaying, on the display screen, the third recommendation.

10. A method for controlling an image display apparatus, the method comprising:

obtaining voice information via a voice recorder of the image display apparatus;

obtaining physical information via a body signal sensor of the image display apparatus;

obtaining, via an image capturing unit of the image display apparatus, image information by capturing via a depth camera included in the image capturing unit, a particular user's face, extracting coordinates of the captured user's face, and capturing via an RGB camera included in the image capturing unit, facial expressions based on the extracted coordinates, the image information being extracted from the captured facial expressions;

respectively storing, in a database of the image display apparatus, the image information, the voice information, and the physical information for a plurality of users including the particular user;

storing, in the database, emotional information for the plurality of users, respectively, the emotional information including content categories preferred by each of the plurality of users;

determining an emotional state of the particular user using the image information extracted from the captured facial expressions, the voice information, and the physical information of the particular user, the emotional information associated with the particular user including the emotional state;

determining at least one recommended broadcast program for the particular user among a plurality of different broadcast programs, based on the determined emotional state and the preferred content categories associated with the particular user;

displaying, on a display screen of the image display apparatus, the plurality of different broadcast programs differentiating the at least one recommended broadcast program that is based on the determined emotional state and the preferred content categories associated with the particular user; and selectively or automatically displaying, on the display screen, the at least one recommended broadcast program that is based on the determined emotional state and the preferred content categories associated with the particular user.

11. The method of claim 10, wherein each of the plurality of different broadcast programs includes at least one of an image object representing a specific emotion for each of the plurality of broadcast programs and a text object indicating at least one of the specific emotion, an attention level, and an emotional intensity level.

12. The method of claim 11, wherein the plurality of different broadcast programs are displayed using an electronic program guide (EPG), and the at least one recommended broadcast program is highlighted or focused on in a different size, brightness or color in comparison to other broadcast programs.

13. The method of claim 11, wherein the plurality of different broadcast programs are displayed using a thumbnail list, and the thumbnail list includes thumbnail images respectively corresponding to the plurality of different programs on the display screen of the image display apparatus or on a subdisplay, and wherein the at least one recommended broadcast program is highlighted or focused on in a different size, brightness or color in comparison to other broadcast programs.

14. The method of claim 13, wherein the subdisplay is distinguished from the display screen of the image display apparatus physically or in hardware, communicates with the display screen wirelessly or by cable, and displays at least one of a subtitle, a channel list, and additional information of the thumbnail list, and wherein the display screen of the image display apparatus displays a reproduced image of the at least one recommended broadcast program.

15. The method of claim 13, wherein the thumbnail images correspond to a content part that elicits a strongest emotional response from the particular user.

16. The method of claim 10, further comprising:

determining an emotional state of the plurality of users, and assigning different weights to each of the plurality of users according to the content categories preferred by each of the plurality of users.

17. The method of claim 3, wherein the weights assigned to the obtained voice information are less than the weights assigned to the obtained image information.

18. An image display apparatus comprising:

a display screen;

a voice recorder configured to obtain voice information;

a body signal sensor configured to obtain physical information;

an image capturing unit configured to obtain image information by capturing via a depth camera included in the image capturing unit, a particular user's face, extract coordinates of the captured user's face, and capture via an RGB camera included in the image capturing unit, facial expressions based on the extracted coordinates, the image information being extracted from the captured facial expressions;

a memory configured to respectively store the image information, the voice information, and the physical information for a plurality of users including the particular user, the memory being configured to store emotional information for the plurality of users, respectively, the emotional information including content categories preferred by each of the plurality of users; and a controller configured to:
  determine an emotional state of the particular user using the image information extracted from the captured facial expressions, the voice information, and the physical information of the particular user, the emotional information associated with the particular user including the determined emotional state,
  determine a content to be recommended for the particular user from among a plurality of different contents, based on both the determined emotional state and the preferred content categories associated with the particular user, and
  selectively or automatically display, on the display screen, the recommended content that is based on both the determined emotional state and the preferred content categories associated with the particular user.

* * * * *